United States Patent
Adams et al.

(10) Patent No.: US 7,595,930 B2
(45) Date of Patent: Sep. 29, 2009

(54) PORTABLE FRONT PROJECTION SCREENS

(75) Inventors: Douglas Adams, Raleigh, NC (US);
Donald Hirsh, Chapel Hill, NC (US);
Sean Hillard, Raleigh, NC (US)

(73) Assignee: Bright View Technologies, Inc., Morrisville, NC (US)

( * ) Notice: Subject to any disclaimer, the term of this patent is extended or adjusted under 35 U.S.C. 154(b) by 0 days.

(21) Appl. No.: 11/961,377

(22) Filed: Dec. 20, 2007

(65) Prior Publication Data

US 2009/0116106 A1 May 7, 2009

Related U.S. Application Data

(60) Provisional application No. 60/985,761, filed on Nov. 6, 2007.

(51) Int. Cl.
*G03B 21/56* (2006.01)
(52) U.S. Cl. .................. 359/443; 359/449
(58) Field of Classification Search ............... 359/443, 359/449; 40/124.15
See application file for complete search history.

(56) References Cited

U.S. PATENT DOCUMENTS

| | | | | |
|---|---|---|---|---|
| 1,379,612 | A | * | 5/1921 | Baver .................. 248/459 |
| 2,320,522 | A | * | 6/1943 | Klein ................. 40/124.15 |
| 2,407,592 | A | * | 9/1946 | Wathen .............. 40/124.15 |
| 4,415,619 | A | | 11/1983 | Fuglein |
| D357,707 | S | | 4/1995 | Moore |
| 5,439,101 | A | | 8/1995 | Brink et al. |
| D370,353 | S | | 6/1996 | Valls et al. |
| D386,008 | S | | 11/1997 | Wong |
| 6,191,886 | B1 | | 2/2001 | Sinkoff |
| D490,835 | S | | 6/2004 | Kotera |
| D493,480 | S | | 7/2004 | Safran et al. |
| 6,873,458 | B1 | | 3/2005 | Bakkom et al. |
| D510,590 | S | | 10/2005 | Safran et al. |
| 7,072,108 | B2 | | 7/2006 | Cruz-Uribe et al. |
| 7,092,166 | B1 | | 8/2006 | Wood |
| D534,360 | S | | 1/2007 | Dempsey |
| 7,180,665 | B2 | | 2/2007 | Daniel et al. |
| 7,192,692 | B2 | | 3/2007 | Wood et al. |
| 7,203,000 | B2 | | 4/2007 | Kotera |
| D544,922 | S | | 6/2007 | Shaffer |

(Continued)

*Primary Examiner*—Christopher Mahoney
(74) *Attorney, Agent, or Firm*—Myers, Bigel, Sibley & Sajovec, P.A.

(57) ABSTRACT

Portable front projection screens include: (a) a first panel having opposing primary outer and inner surfaces, the first panel having at least first and second portions that are foldable relative to each other so as to be oriented at an angle relative to each other in an open configuration and closed to a coplanar flat configuration; and (b) a second panel foldably attached to the first panel and having opposing outer and inner primary surfaces. The second panel inner surface comprises a high gain, high Ambient Rejection Ratio projection screen that extends over a major portion of the inner surface. In a closed configuration, the first and second panels reside adjacent and substantially parallel to each other. The first and second panels cooperate to open to a user viewing configuration whereby the second panel is substantially vertical with the projection screen oriented to face forward toward a user and the second portion of the first panel defines a substantially horizontal base with the first portion of the first panel angled upwardly and inwardly from the horizontal base toward the substantially vertical second panel.

26 Claims, 18 Drawing Sheets

U.S. PATENT DOCUMENTS 7,262,912 B2 8/2007 Wood
2007/0086088 A1* 4/2007 Astill .......................... 359/443
2008/0158669 A1* 7/2008 O'Keefe et al. ............. 359/443

* cited by examiner

Fold Line

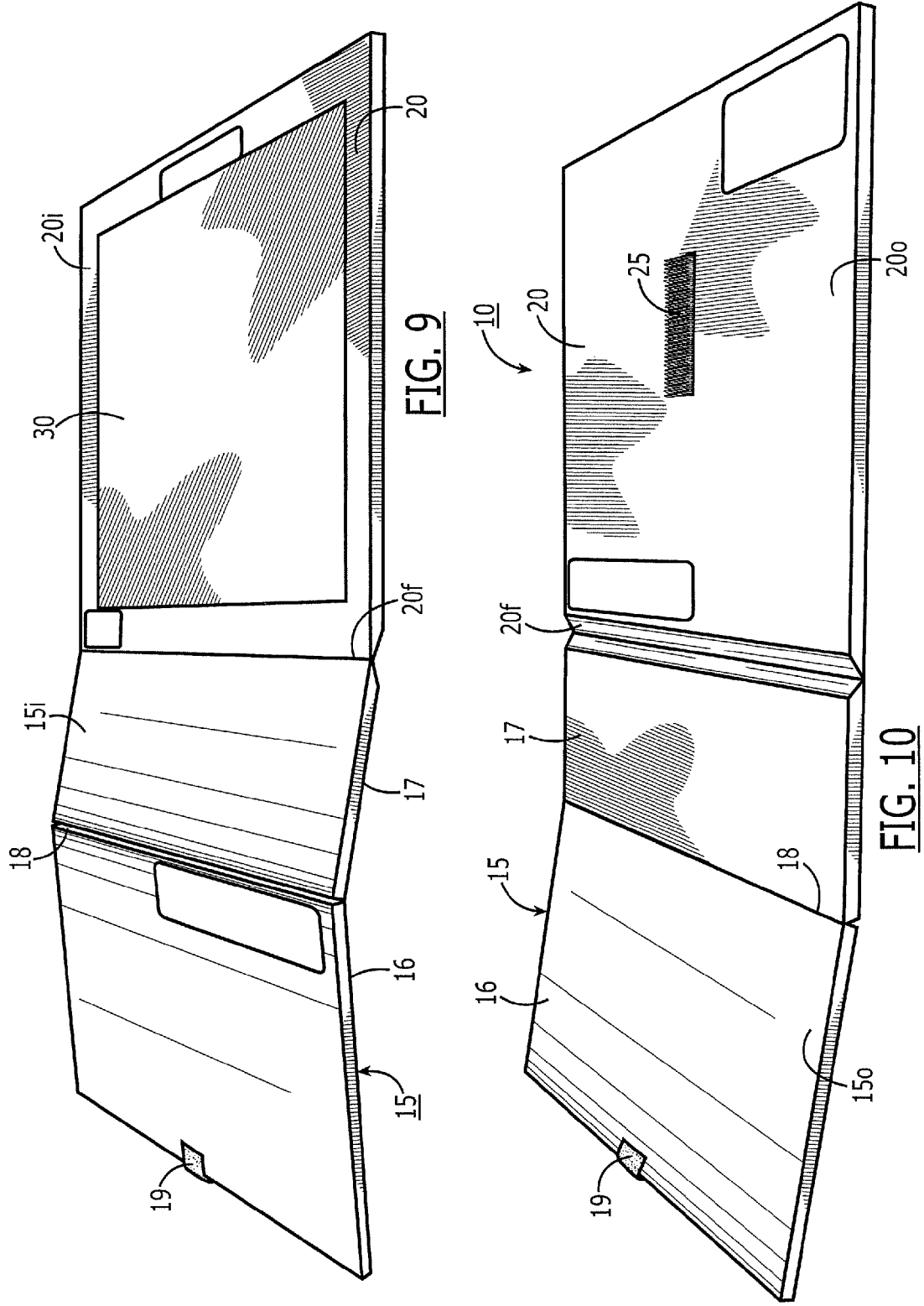

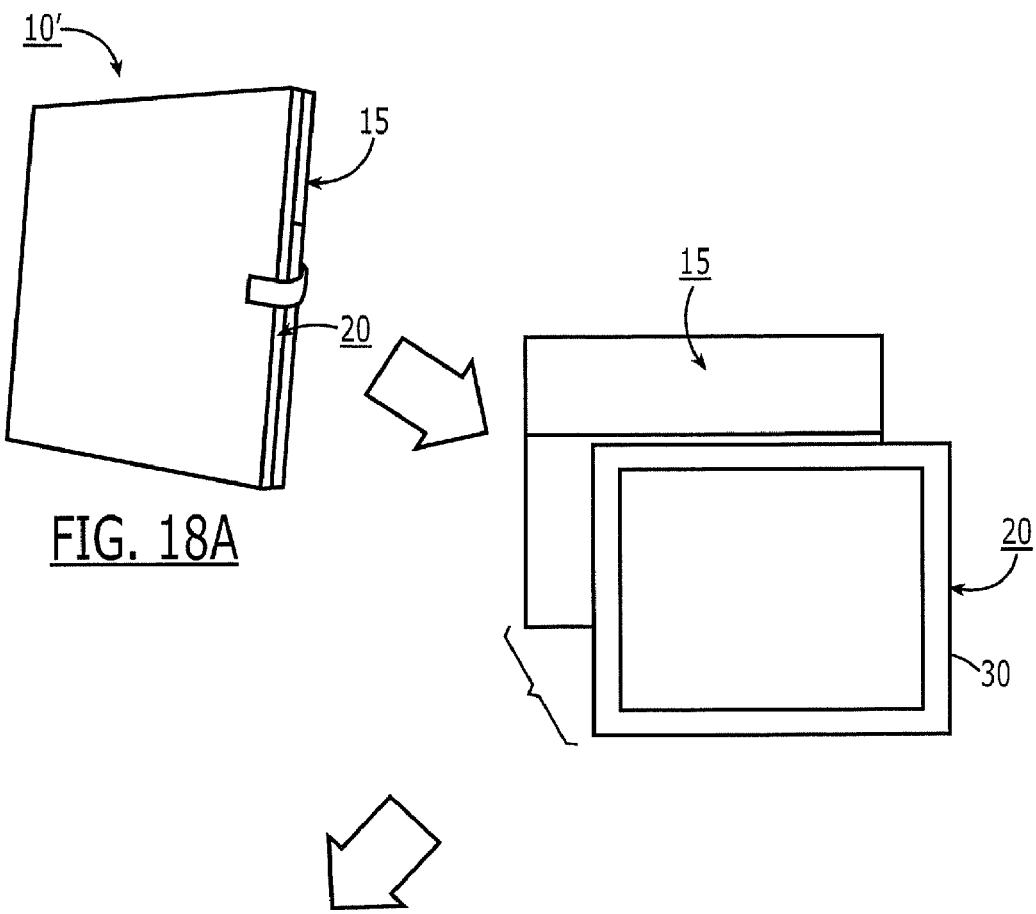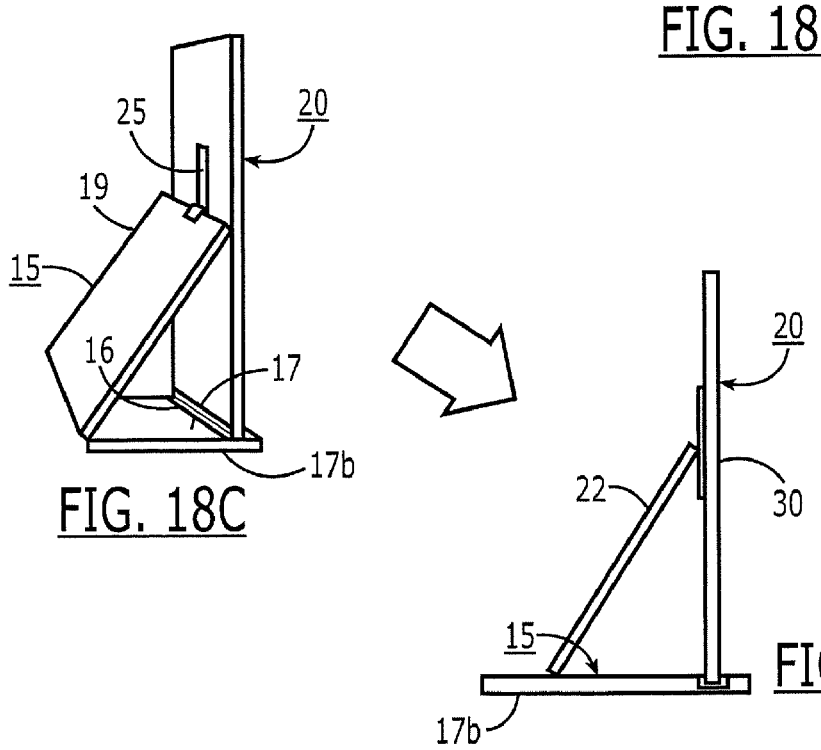

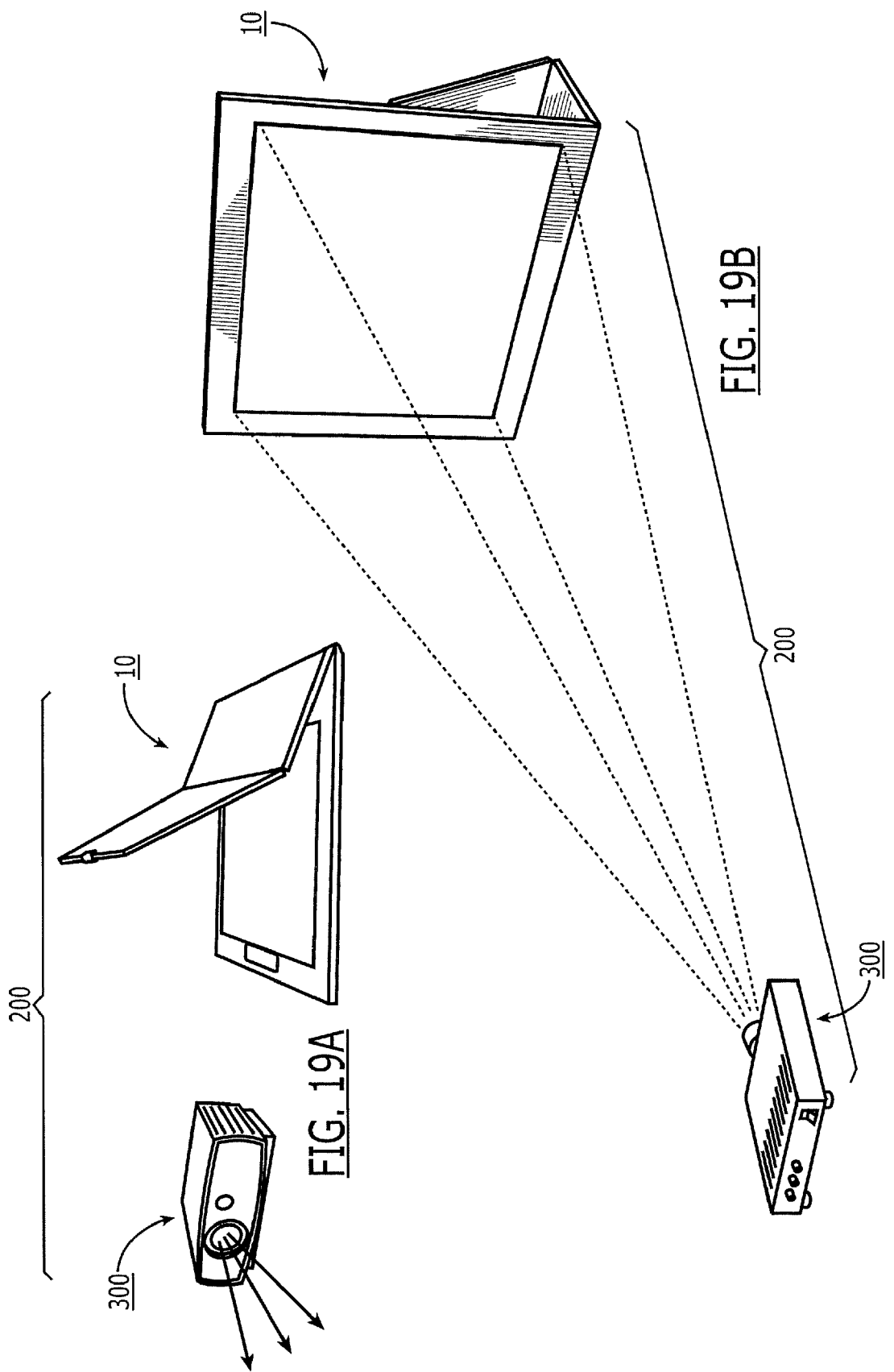

PORTABLE FRONT PROJECTION SCREENS

RELATED APPLICATION

This application claims the benefit of priority to U.S. Provisional Application Ser. No. 60/985,761 filed Nov. 6, 2007, the contents of which are hereby incorporated by reference as if recited in full herein.

FIELD OF THE INVENTION

This invention relates to front projection systems and particularly to front projection screens where the projector and viewer(s) are on the same side of the projection screen.

BACKGROUND OF THE INVENTION

Video projectors, used in conjunction with front projection screens (also referred to as reflective- or reflection-type projection screens), are a popular way to display video and computer imagery, and are commonly used in cinemas, home theaters and other consumer and commercial applications.

Front projection screens that are used in cinema or home theater applications generally are viewed in controlled illumination settings such as dark or subdued lighting conditions including, for example, windowless corporate meeting rooms, dedicated commercial or home theater installations and the like. In such controlled and/or dark room conditions, a suitably placed front projection screen, typically constructed with a matte white vinyl viewing surface, can deliver a sufficient and even superior viewing experience of the projected image.

With recent advances in reduced-cost, light-weight projectors, more users deploy projection systems in uncontrolled lighting. However, many commercially available screens lack an ability to effectively reduce or otherwise mitigate reflections of ambient illumination. Ambient illumination striking the projection screen surface produces a loss of contrast, and viewers perceive the image to be washed out in brightly lit settings. This is especially noticeable with mid- and/or lower-luminance projectors. However, in some situations, such as business meetings, lectures or other educational events, or in personal uses like multi-player or single player on-screen gaming and/or portable theater, it may be desirable to use projection devices in high-ambient or uncontrolled lighting situations. Coupled with the advances in portable projectors there is an emerging need for portable projection screens for use in mixed-light and/or environments with uncontrolled ambient illumination.

SUMMARY OF EMBODIMENTS OF THE INVENTION

Embodiments of the invention are directed to portable projection screens that may be particularly suitable for use in mixed light conditions.

Some embodiments are directed to portable front projection screens that include: (a) a first panel having opposing primary outer and inner surfaces, the first panel having at least first and second portions that are foldable relative to each other so as to be oriented at an angle relative to each other in an open configuration and closed to a coplanar flat configuration; and (b) a second panel foldably attached to the first panel and having opposing outer and inner primary surfaces. The second panel inner surface comprises a high gain, high Ambient Rejection Ratio projection screen that extends over a major portion of the inner surface. In a closed configuration, the first and second panels reside adjacent and substantially parallel to each other. The first and second panels cooperate to open to a user viewing configuration wherein the second panel is substantially vertical with the projection screen and oriented to face forward toward a user, and the second portion of the first panel defines a substantially horizontal base with the first portion of the first panel angled upwardly and inwardly from the horizontal base toward the substantially vertical second panel.

Other embodiments are directed to portable front projection screens that include: (a) a first panel having opposing primary outer and inner surfaces, the first panel having first and second portions that are foldable relative to each other so as to be oriented at an angle relative to each other in an open viewing configuration and closed to a substantially coplanar flat configuration in a closed storage configuration; and (b) a second panel having opposing upper and lower edge portions, the lower edge portion being integrally or releasably attached to the first portion of the first panel, the second panel having opposing outer and inner primary surfaces, wherein the second panel inner surface comprises a high gain front projection screen. In the closed storage configuration, the first and second panels reside adjacent and substantially parallel to each other. The first and second panels cooperate to provide the viewing configuration wherein the second panel is substantially vertical with the projection screen and oriented to face forward toward a user and the second portion of the first panel defines a substantially horizontal base with the first portion of the first panel angled upwardly and inwardly from the horizontal base toward the substantially vertical second panel.

Still other embodiments are directed to methods of setting up a portable projection screen. The steps include: (a) providing a portable screen comprising first and second panels with respective inner and outer primary surfaces, with the first and second panels residing adjacent and substantially parallel to each other one above the other in a folded closed configuration, wherein the second panel inner surface has an integral front projection screen; and (b) orienting the first and second panels to a viewing configuration with the projection screen facing forward and the second panel being substantially vertical while at least a portion of the first panel extends rearward away from the projection screen to define a substantially horizontal support base.

Yet other embodiments are directed to low lumen portable projector systems. The systems include a portable low-lumen projector and a front projection screen adapted to receive light and images from the portable low-lumen projector. The projection screen includes: (a) a first panel having opposing primary outer and inner surfaces, the first panel having first and second portions that are foldable relative to each other so as to be oriented at an angle relative to each other in an open configuration and closed to a substantially coplanar flat configuration; and (b) a second panel foldably attached to the first panel and having opposing outer and inner primary surfaces, wherein the second panel inner surface comprises a front projection screen. In a closed configuration, the first and second panels reside adjacent and substantially parallel to each other, and the first and second panels cooperate to open to a user viewing configuration, wherein the second panel is substantially vertical with the projection screen and oriented to face forward toward a user, and the second portion of the first panel defines a substantially horizontal base with the first portion of the first panel angled upwardly and inwardly from the horizontal base toward the substantially vertical second panel.

In some embodiments, the portable projection screens can be compact and have a low profile, and the screen can be a high-contrast screen for use in ambient illumination with a standard viewing configuration, e.g., providing one of a 4:3 or 16:9 aspect ratio.

BRIEF DESCRIPTION OF THE DRAWINGS

FIG. 9 is a side perspective view of the screen case shown in FIG. 1 with the screen case opened and the first and second panels oriented with their respective inner surfaces facing up.

FIG. 10 is a side perspective view of the screen case shown in FIG. 9 but with the respective inner surfaces of the first and second panels shown facing down and the respective outer surfaces facing up.

FIGS. 18A-18D are schematic illustrations of an alternate embodiment of the screen case illustrating that the panels can be releasably attached according to other embodiments of the present invention. FIG. 18A is a front schematic view, FIG. 18B is an exploded view, FIG. 18C is a side perspective view of a viewing configuration, and FIG. 18D is a side view of an exemplary viewing configuration.

FIG. 19A is a schematic illustration of a low-lumen projector system with a projector screen assembly according to embodiments of the present invention.

FIG. 19B is a front perspective view of a projector in optical communication with the screen according to embodiments of the present invention.

DETAILED DESCRIPTION

Figure 1:
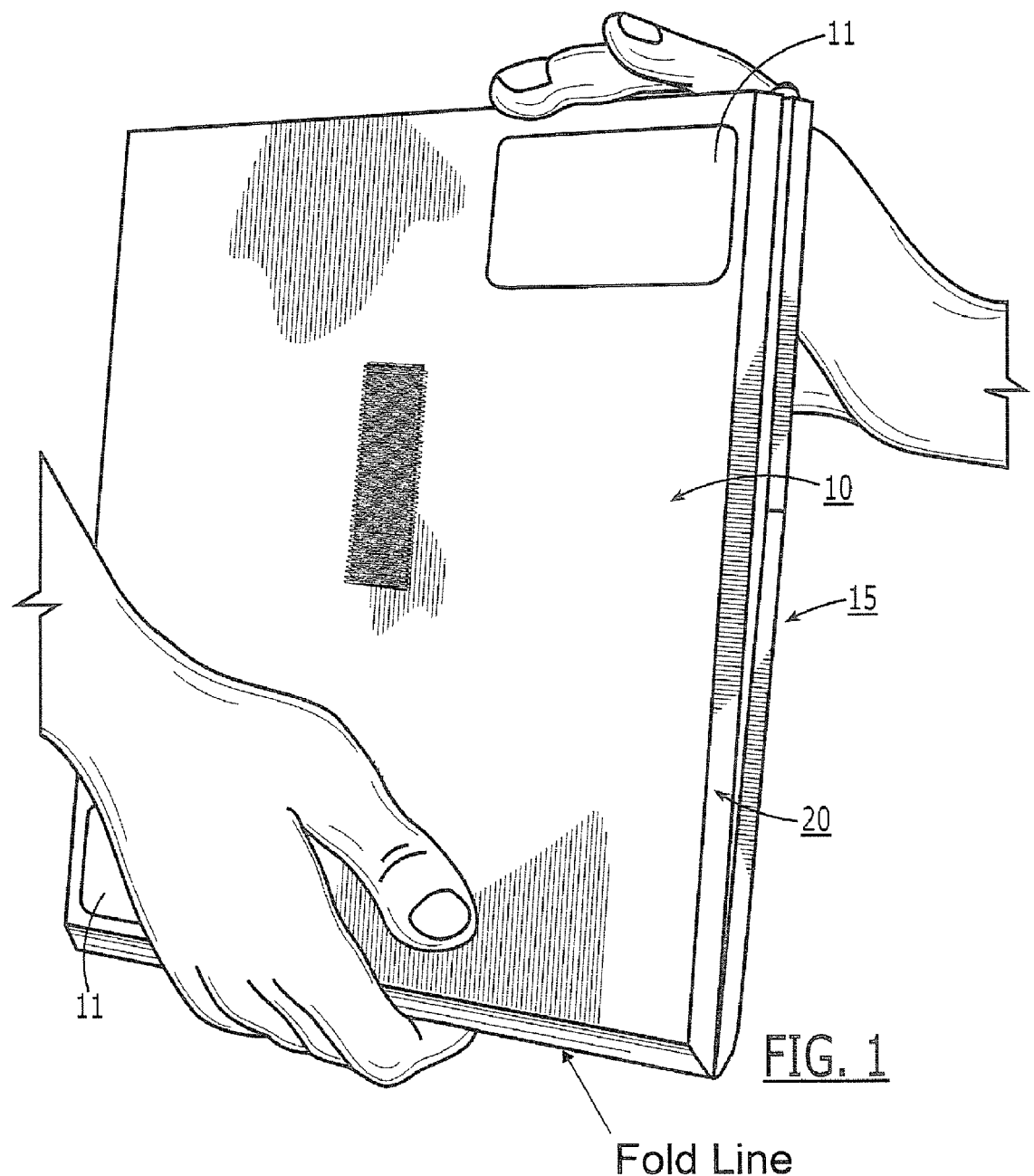
FIG. 1 is a side perspective view of a portable front projection screen in a closed (storage) configuration according to exemplary embodiments of the present invention.

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. In the drawings, the thickness of layers and regions may be exaggerated for clarity. Like numbers refer to like elements throughout. As used herein the term "and/or" includes any and all combinations of one or more of the associated listed items and may be abbreviated as "/".

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes," and/or "including" when used in this specification, specify the presence of stated features, regions, steps, operations, elements, and/or components, but do not preclude the presence or addition of one or more other features, regions, steps, operations, elements, components, and/or groups thereof.

It will be understood that when an element such as a layer or region is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be understood that, although the terms first, second, etc. may be used herein to describe various elements, components, regions, layers and/or sections, these elements, materials, regions, layers and/or sections should not be limited by these terms. These terms are only used to distinguish one element, material, region, layer or section from another element, material, region, layer or section. Thus, a first element, material, region, layer or section discussed below could be termed a second element, material, region, layer or section without departing from the teachings of the present invention. In particular, as used herein, the relative terms "first direction" and "second direction" mean two different, not necessarily orthogonal, directions, whereas the terms "horizontal" and "vertical" indicate specific orientations based upon the ultimate orientation of the projection screen. Moreover, the terms "front" and "back" are used herein to describe opposing outward faces of a front projection screen. Conventionally, the viewing face is deemed the front.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The term "light-weight" in reference to the projection screen device (e.g., the screen and the portable case) means that the portable screen device weighs less than 1 pound, typically between about 4 and 8 ounces. The term "cellulose" means that the material includes paper fibers and typically is formed from a cardboard substrate.

Front projection systems rely on a projector which produces a generally high-intensity image which is focused and/or directed onto the projection screen. The reflected image from the screen is what viewers perceive. When the projected/reflected image is substantially brighter than the ambient surround viewers experience the image as being sufficiently bright. A number of terms are used to characterize the performance of the projection screen in a projection system.

The term "gain" is a dimensionless ratio of the measured luminance of a particular screen (the numerator), measured on-axis, to the luminance of a white diffuse standard (Lambertian white reflector) (the denominator) under identical, substantially collimated illumination. Conventional projection screens have gains ranging from 0.9 to 2.5. The term "high-gain" refers to a screen with a gain of 3.0 or higher. In some embodiments, some high-gain screens can have a gain that is between about 4-10 (or even greater), including, for example, between about 6-8. High gain can be an important attribute for screens used with low-luminance projectors because a high gain screen allows a low luminance projector to create a bright image with a luminous flux equivalent to a much brighter projector being used with a conventional projection screen.

The term "half-angle" refers to the measure or angle from normal to the front face of the projection screen where the intensity of reflected illumination is half the intensity of its maximum on-axis intensity. Depending on the construction of the projection screen, half-angles may be symmetric or asymmetric. Half-angle is an objective measure of field-of-view for a particular screen, which is a proportional measure of how far a viewer may deviate from a centered, normal viewing of the projection screen.

In the present context, the term "high-contrast" describes an image projected and illuminated by the projection system which is characterized (a) by a wide (optical) dynamic range and (b) in that ambient illumination which may strike the projection screen does not significantly diminish the dynamic range of the presented image.

The term "Ambient Rejection Ratio" (ARR) is a dimensionless number which gives an indication of the ability of the projection screen to discriminate in favor of reflecting projected images back toward a viewer(s) while efficiently shunting ambient reflected light away from the viewer(s). The ARR is the ratio of the diffuse-reflectance source (DS) to the diffuse reflectance-ambience (DA—both of these described and defined below), and is a convenient measure or figure of merit of how well the screen rejects ambient illumination. Most conventional front projection screens have an ARR between 0.98 and 1.15. The term "high" ARR refers to screens with an ARR of at least 1.20. A white Lambertian reflectance standard has an ARR of 1. A projection screen with an ARR of between about 1.3 and 1.6 generally shows a reasonable trade-off between an ability to partially reject ambient illumination the on-axis illumination of the projected image. Some embodiments are directed to high ARR projection screens with ARRs typically between about 1.25 and 2. Higher ARRs may be available in the future and high ARR screens contemplated for use with the present invention are not limited to the 1.25-2 ARR range. A projection screen with a high ARR allows for the projection screen to be particularly useful in mixed ambient lighting conditions because image contrast is better maintained when the artifacts of ambient illumination are diminished.

The term "diffuse reflectance-source" (DS) is a ratio that evaluates how efficiently the screen distributes a projected image back into ambient surround. This diffuse reflectance-source ratio is a dimensionless ratio of a luminance signal of the projection screen (numerator) divided by a luminance signal of a white standard (denominator). As with the gain measurement described above, the luminance signal is provided by substantially collimated illumination delivered to samples held in place at the sampling port of an integrating sphere and the signal is measured by a detector placed at an oblique angle from the source and screen.

Figure 20A:
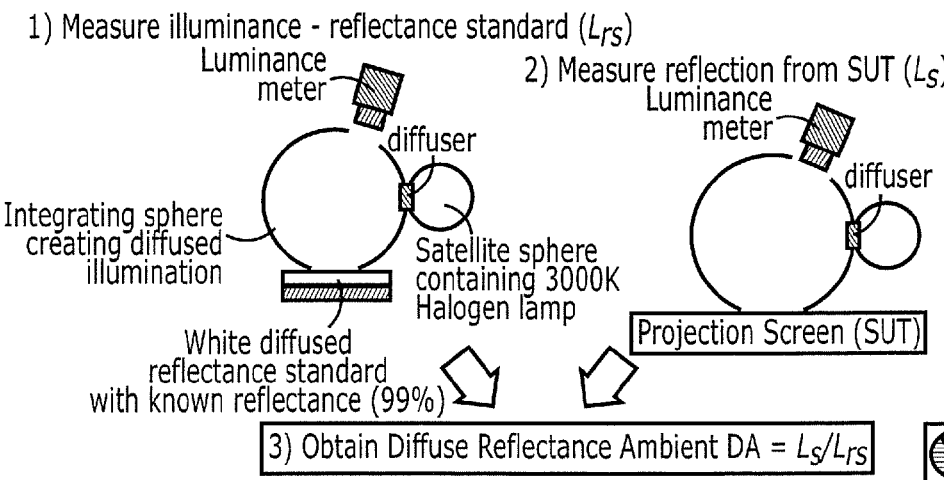
FIGS. 20A and 20B are schematic illustrations of procedures for evaluating the Ambient Rejection Ratio (ARR) of a screen.
Figure 20B:
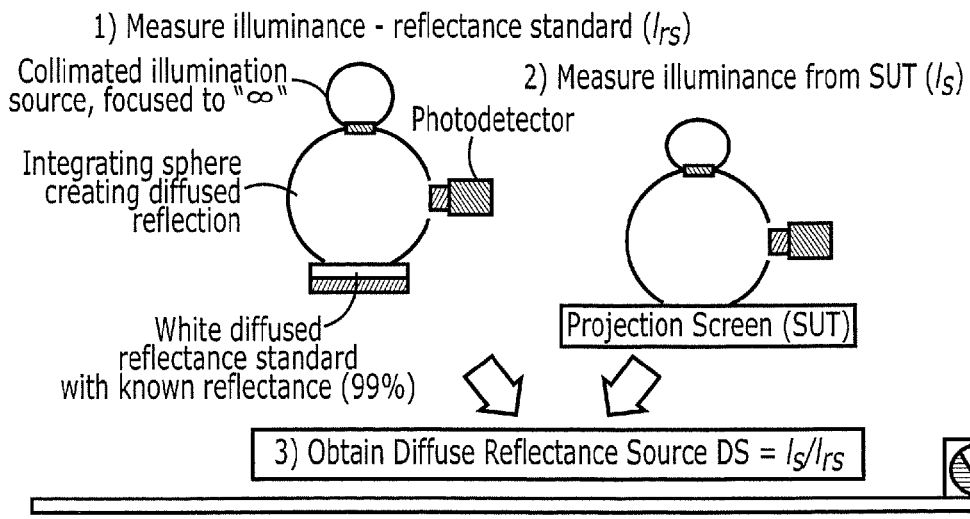

The term "diffuse reflectance-ambient" (DA) is a ratio that evaluates how efficiently the screen distributes the ambient illumination back to the projection screen viewer. The diffuse reflectance-ambient ratio is a dimensionless ratio of the illuminance signal of the projection screen (numerator) divided by the illuminance signal of a white standard (denominator). The illuminance signal is delivered to samples held in place at the sampling port of an integrating sphere, where the illumination source is diffuse and oblique from the samples and the signal is measured by a detector placed normal to sample. FIGS. 20A and 20B schematically illustrate measurement procedures for the DS and DA ratios.

The terms "low-luminance" or "low lumen" refer to front projectors that have illumination at less than about 500 lumens or less, typically ranging between about 5-500 lumens. A "micro" projector is characterized by a small physical enclosure and has a luminous flux of 200 lumens or less. A subclass of the low lumen projectors is the "ultra-low-lumen" projectors, also known as the "picoprojectors" which are characterized by an extremely small enclosure (5-25 cubic centimeters) and a luminous output of between about 10-20 lumens or even less. Examples of low-power and/or low-luminance projectors include, but are not limited to, LED/DLP illuminated projector systems, which may be low-lumen, low power and light weight (typically about 5-10 pounds or even less). Recent examples of microprojectors include the LG Electronics HS-101, 100 lumen, LED/DLP-based projector and the Boxlight (Poulsbo, Wash.) Bumble-Bee, a LED/DLP, sub-100 lumen projector.

Different projectors and different viewing environments and/or applications may warrant projection screens with different screen characteristics (typically quantified in gain, half-angle, ARR) for maximal effectiveness. Screen production techniques such as those described in U.S. Pat. No. 7,092,166 B1 (Wood), U.S. Pat. No. 7,192,692 B2 (Wood et al.), and U.S. Pat. No. 7,262,912 B2 (Wood II) provide a microlens-based design and implementation mechanisms in which all these attributes can be controlled and optimized in ways believed to have been previously unavailable to screen designers. The contents of these patents are hereby incorporated by reference as if recited in full herein.

The screens of the instant invention are particularly suitable for use with low-lumen and/or low-power and light-weight projectors in incontrolled lighting conditions, e.g., mixed ambient lighting conditions, rather than controlled darkened (windowless) rooms, where there may be a need to create a bright image from low-power imaging source and to create a projection screen that can maximize the perceived contrast of the image in the uncontrolled environment.

Although the present embodiments are directed for use with low-lumen, lightweight projectors, the present invention is not limited thereto and the screens may also be used with mid or high-lumen outputs. The term "mid-lumen" refers to projectors with lumen outputs above 500 lumens and below about 3,000 lumens.

For some embodiments, which may be particularly suitable for use with ultra-low luminance projectors, e.g., sub-100 lumen projectors, the projection screen can have an ARR of at least about 1.4 and a high-gain luminance of about 6 or greater.

The projection screens of some embodiments of the invention may be particularly suitable as portable high-gain and high ARR screens for front projectors, including personal-use devices incorporating low-power projectors. Examples of such devices include pervasive computer devices with embedded projectors, such as microprojectors or picoprojectors, laptop computers, handheld computers, PDAs, multi or single player gaming devices and cellular telephones. The term "personal" with respect to a screen refers to a small-viewing area screen sized and configured for concurrent substantially on-axis viewing by the user and/or a small audience such as between about 1-6 persons.

Figure 2:
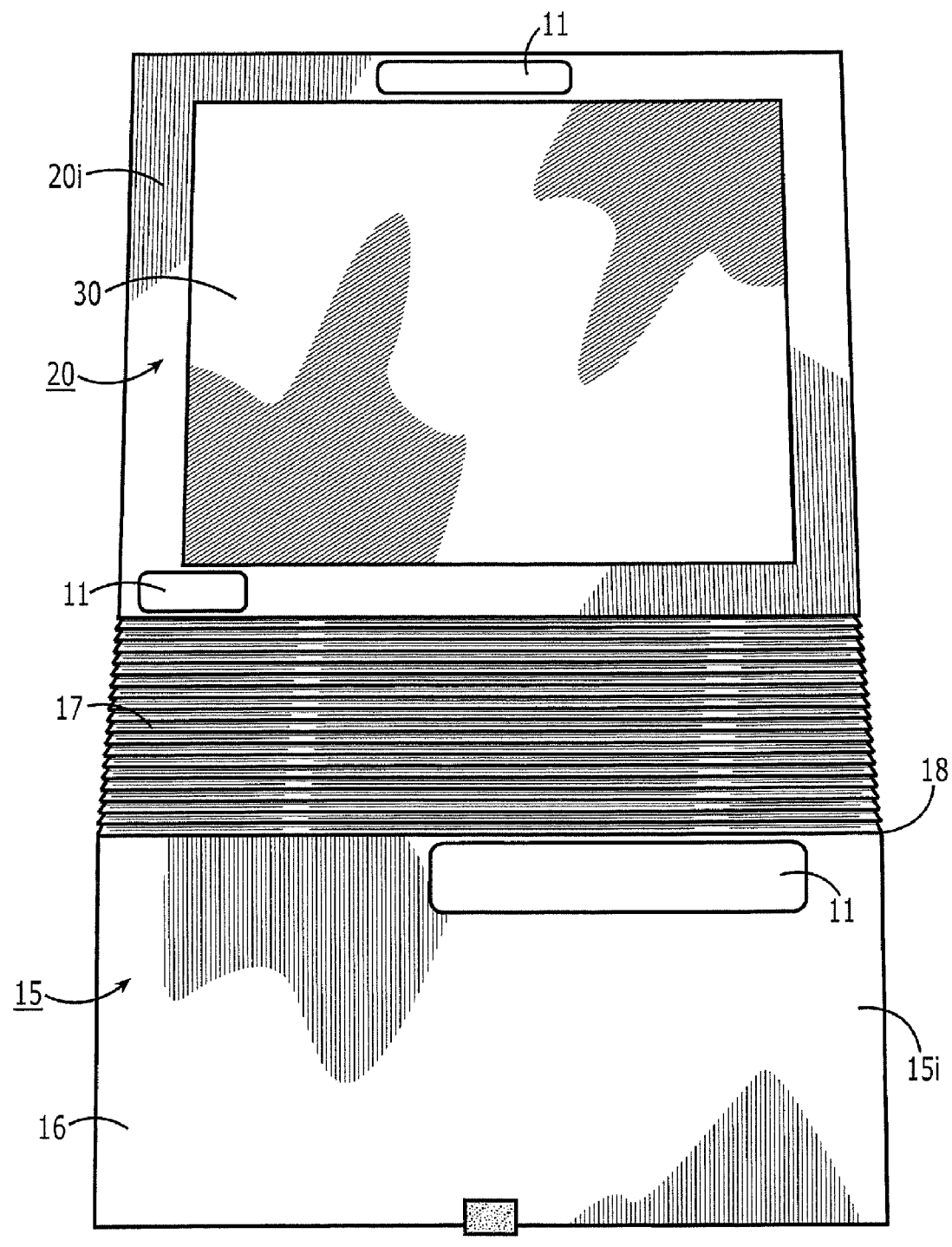
FIG. 2 is a front view of the projection screen shown in FIG. 1 with the first and second panels opening to reveal inner surfaces thereof according to embodiments of the present invention.
Figure 3:
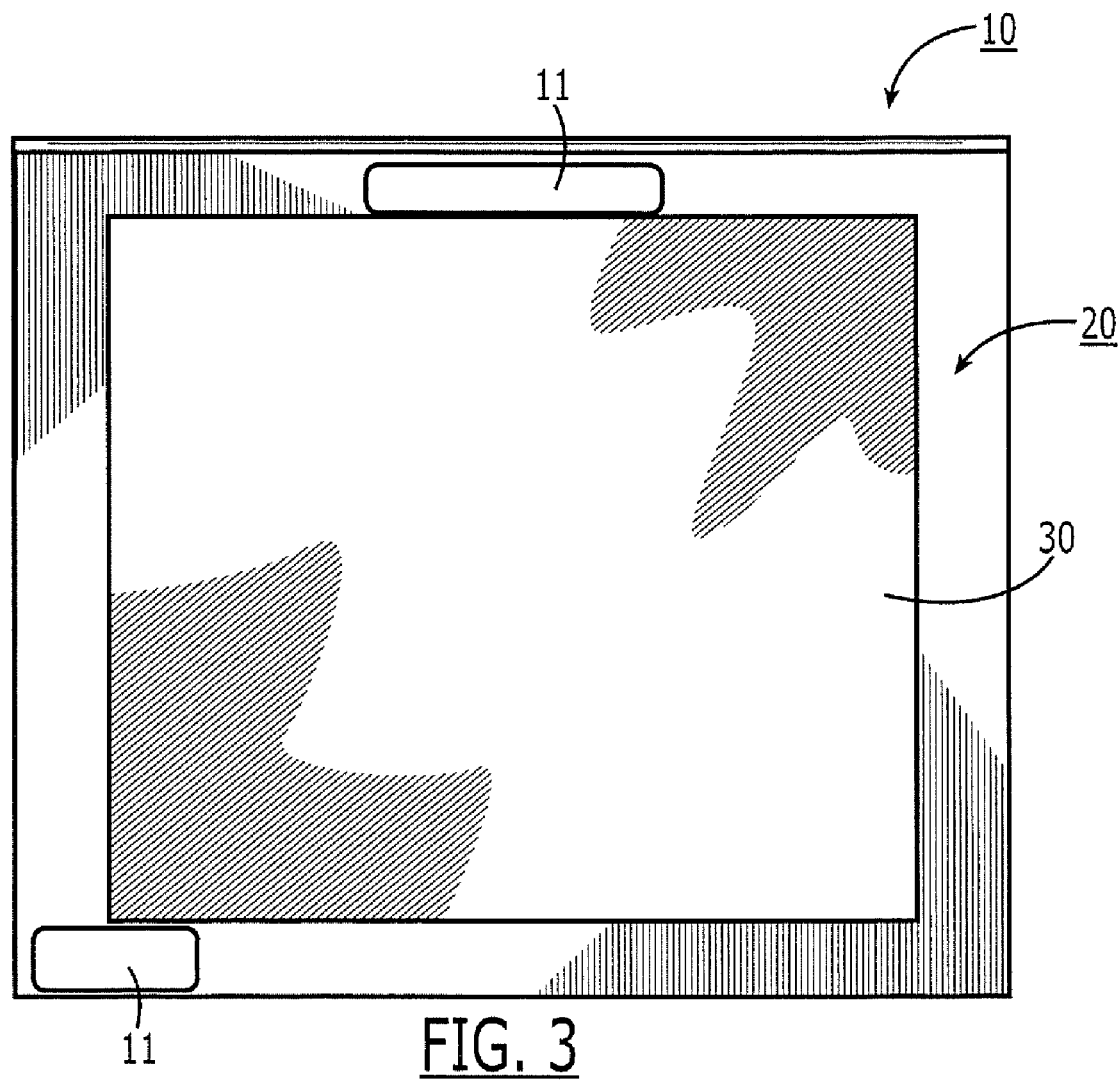
FIG. 3 is a front view of the projection screen shown in FIGS. 1 and 2 illustrating a viewing configuration with the projection screen facing toward a user/viewer (and front projector) according to embodiments of the present invention.

Referring now to the figures, FIGS. 1-4 illustrate a portable front projection screen 10 provided in a "folio" type folder or case with multiple panels that fold into a base support with an upstanding projection screen 30 (FIG. 2). As shown in FIG. 1, in some embodiments, the screen 10 includes first and second panels 15, 20 that close to reside adjacent and substantially parallel to each other. As shown in FIG. 2, the panels open to reveal inner surfaces 15i, 20i. The second panel 20 includes a projection screen 30 thereon. The panels 15, 20 can be lightweight and sufficiently rigid to be able to retain their structure when open to the viewing configuration shown in FIGS. 3 and 4. The panels 15, 20 can comprise a sufficiently rigid cellulose material (paper, cardboard, etc . . . ) and/or other suitable material, such as a polymer or combinations thereof. The panels 15, 20 can be the same size, shape, thickness and configuration or may have different size, shapes and/or configurations or thicknesses. As shown, the panels 15, 20 are substantially rectangular, with the long side typically oriented to be horizontal in the viewing configuration, as shown in FIG. 3. The panels 15, 20 can have a thickness of less than about 0.25 inches. The panels 15, 20 can have a width dimension of between about 10-20 inches and a height dimension of between about 8-20 inches (the W and H dimensions refer to the orientation in the viewing configuration). A leather or other suitable covering may be placed over one or more surfaces of either or both the panels. The inner surface 15i of panel 15 can include an anti-scratch coating or soft and/or smooth material (or even a buffer member) that can protect the screen 30 from scratching. In other embodiments, the inner surfaces 15i, 20i can be configured to remain spaced apart and not contact (at least about the screen area) to inhibit wear and/or scratching during storage or closure.

Figure 5:
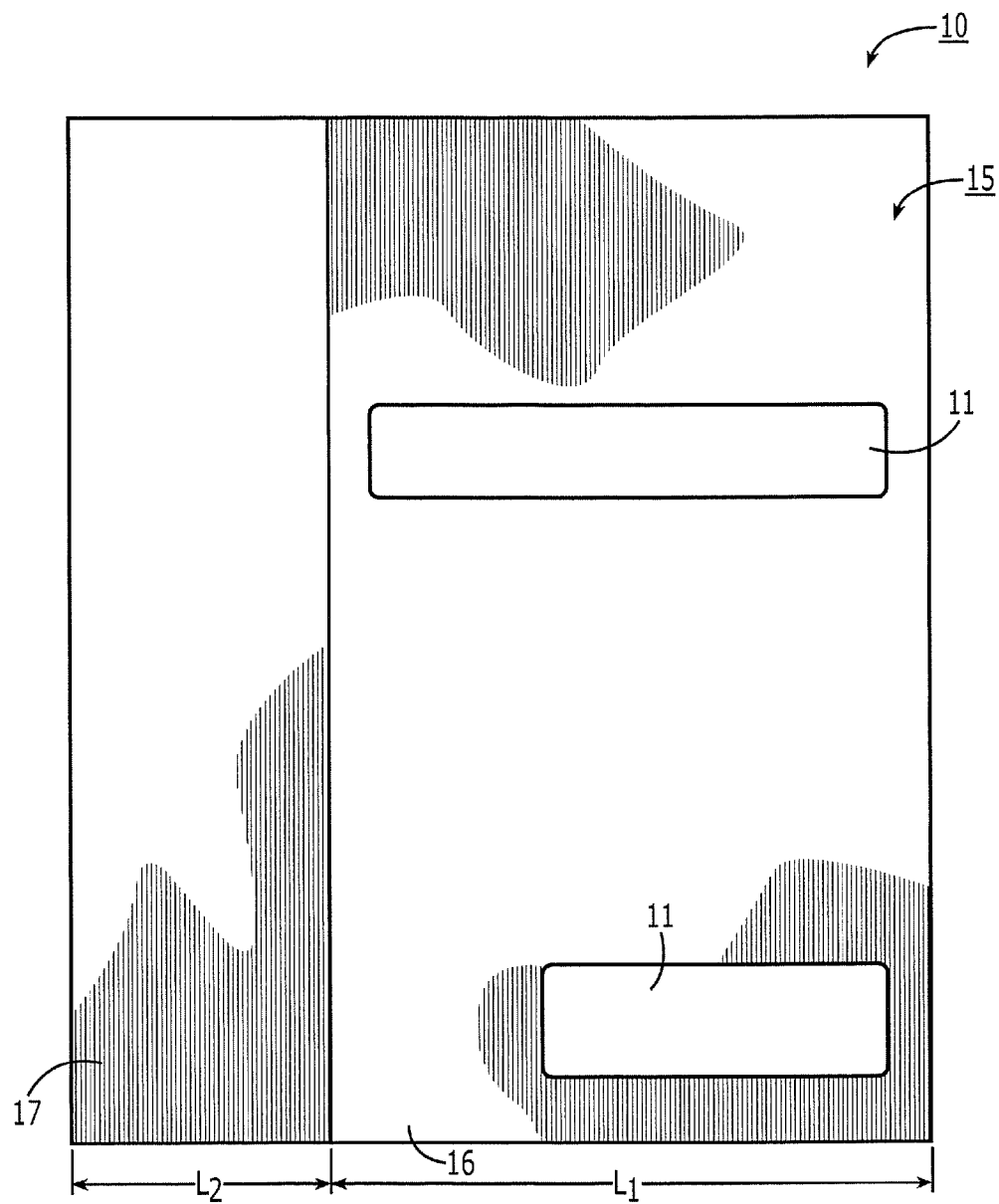
FIG. 5 is a front view of the front projection screen of FIG. 1 with the front cover shown according to embodiments of the present invention.

Referring again to FIG. 2, the first panel 15 can include at least two foldable segments 16, 17. The panel 15 can be partitioned to form these segments 16, 17 with a laterally extending fold line 18 extending therebetween. However, hinges or other foldable configurations and structures or members may also be used. As shown, one portion or segment (shown as the lower portion 16 in the unfolded configuration and as the upper portion 16 in the closed storage configuration of FIG. 5) may have a longer length than the other portion 17. For ease of discussion, the panel portion 16 that is above or to the left of the other panel portion in the closed position (with the first panel 15 facing forward) as shown in FIG. 5 will be called the "upper portion" and the other portion 17 will be called the "lower portion." However, these descriptions are not to be limited to any particular configuration as it is apparent that a user can orient the case in any suitable direction, such as making the portion 17 residing above the portion 16. In some particular embodiments, the lower portion 17 has a length $L_2$ that is between about 20-40% of the length of the upper portion $L_1$.

Figure 4:
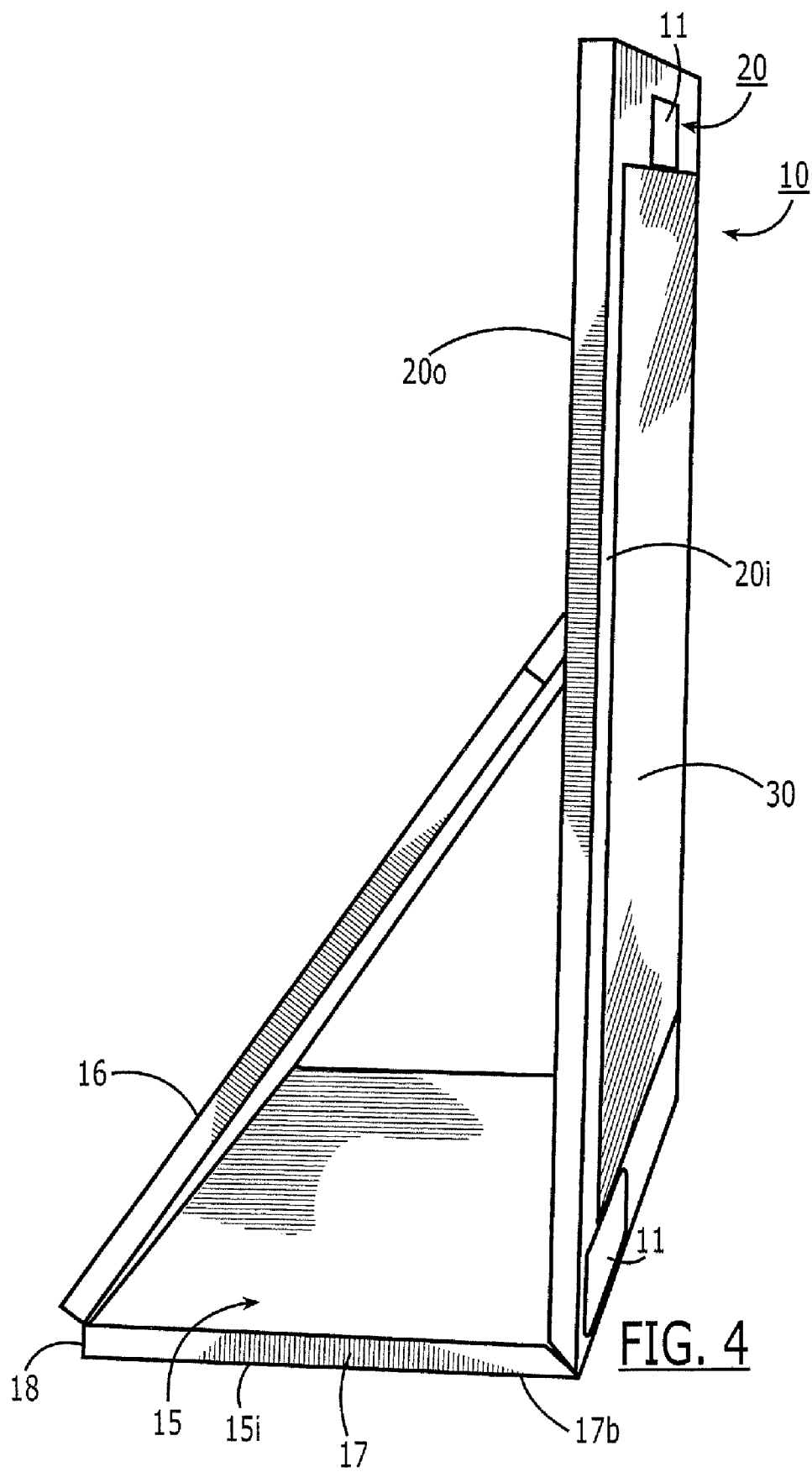
FIG. 4 is a side view of the projection screen of FIG. 1 shown in the viewing configuration shown in FIG. 2 according to some embodiments of the present invention.

FIG. 2 illustrates that when unfolded or open, the two panels can reside in a coplanar relationship, one above the other. As shown in FIG. 4, the panel 15 can be folded so that the lower portion 17 of the panel 15 defines a support base 17b and the upper portion of the panel 16 resides above the base 16b angled inwardly and upwardly to contact the rear surface of the second panel 20.

Figure 6:
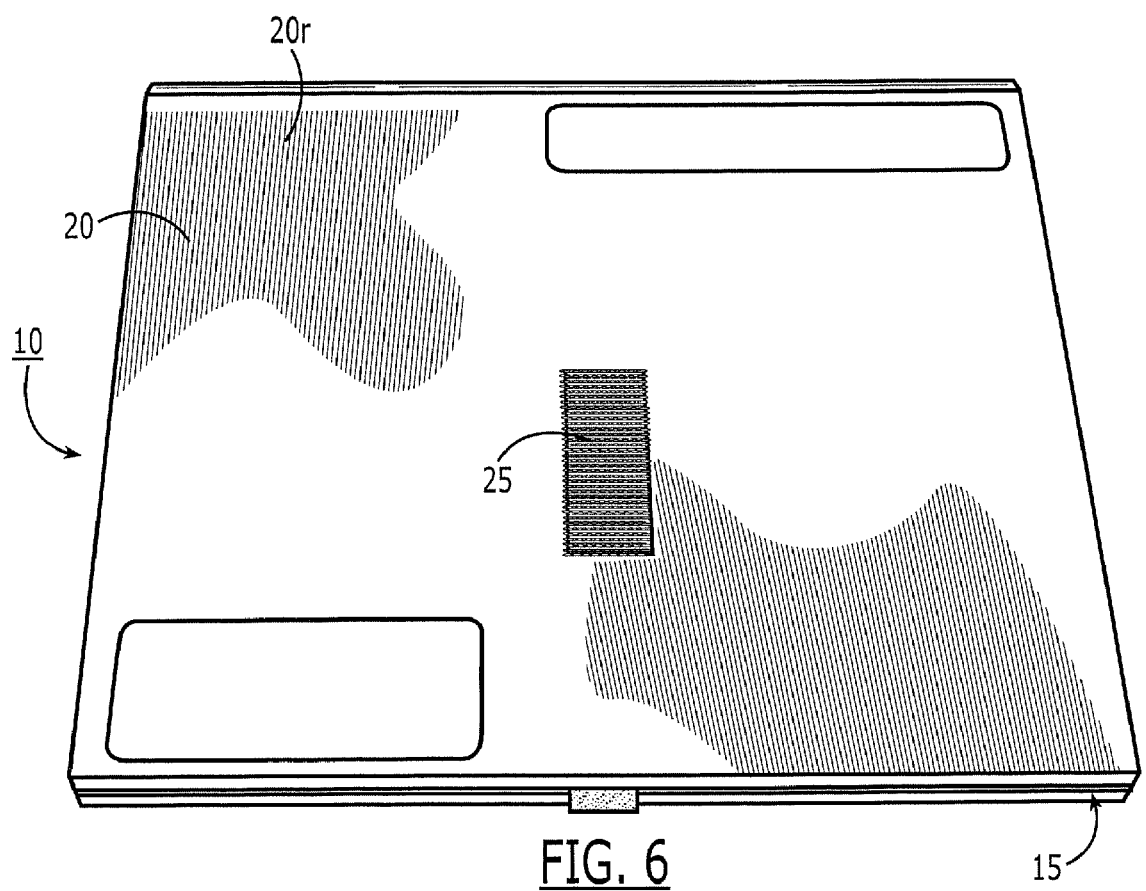
FIG. 6 is a bottom perspective view of the projection screen shown in FIG. 1 illustrating an outer surface of a second panel according to embodiments of the present invention.
Figure 7:
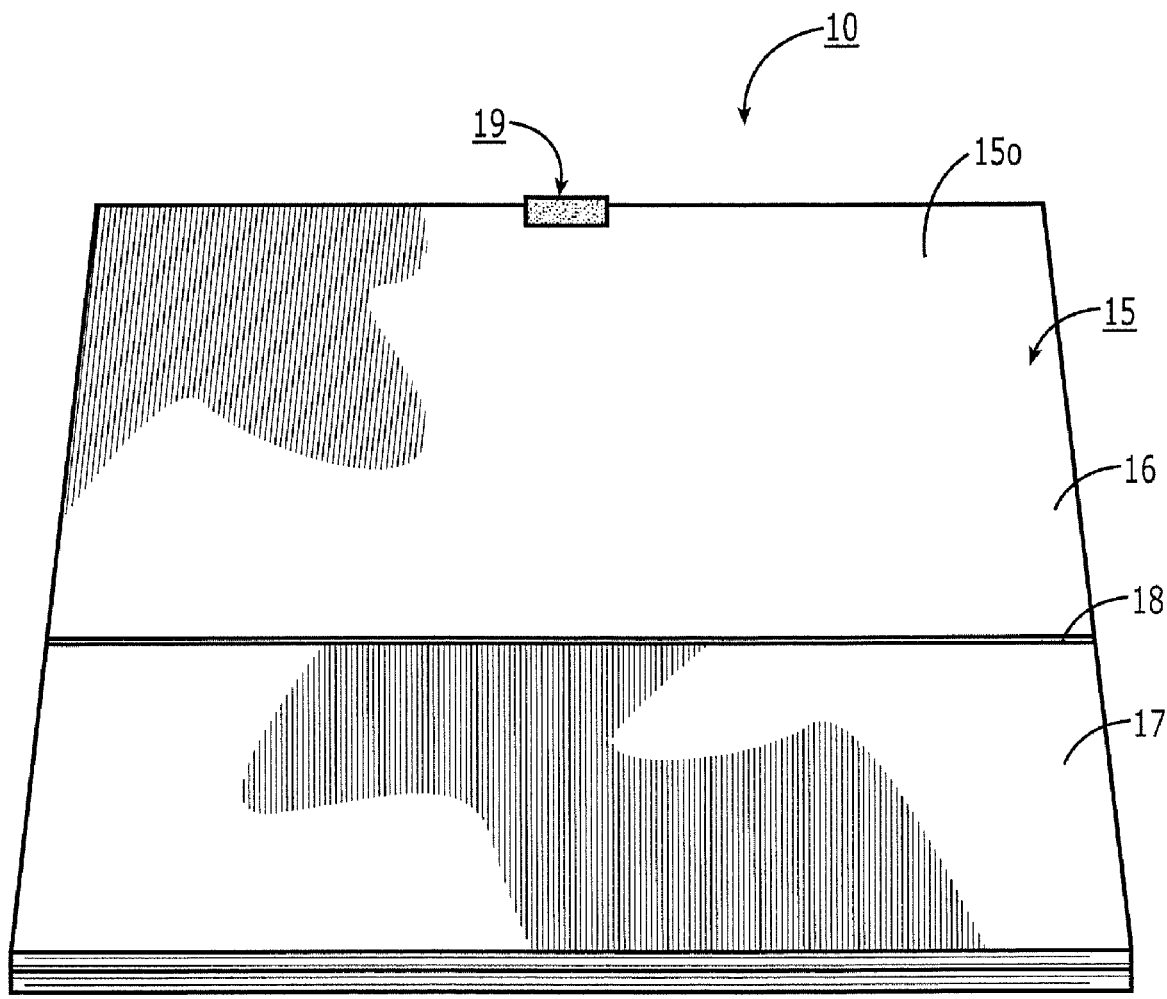
FIG. 7 is a top perspective view of an outer surface of a first panel according to embodiments of the present invention.
Figure 8:
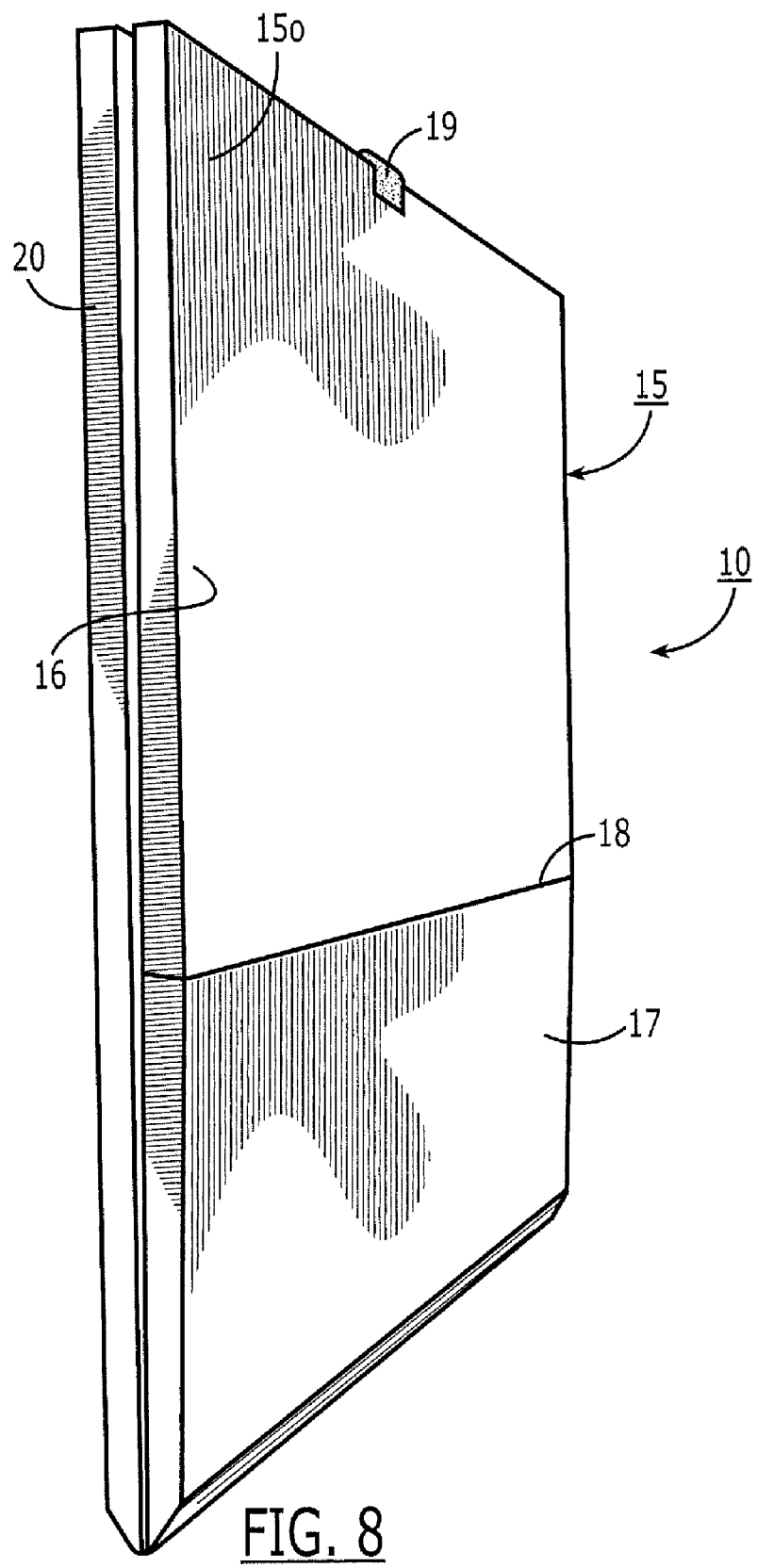
FIG. 8 is a side perspective view of the screen case shown in FIG. 1 with the outer surface of the first panel facing outward.
Figure 11:
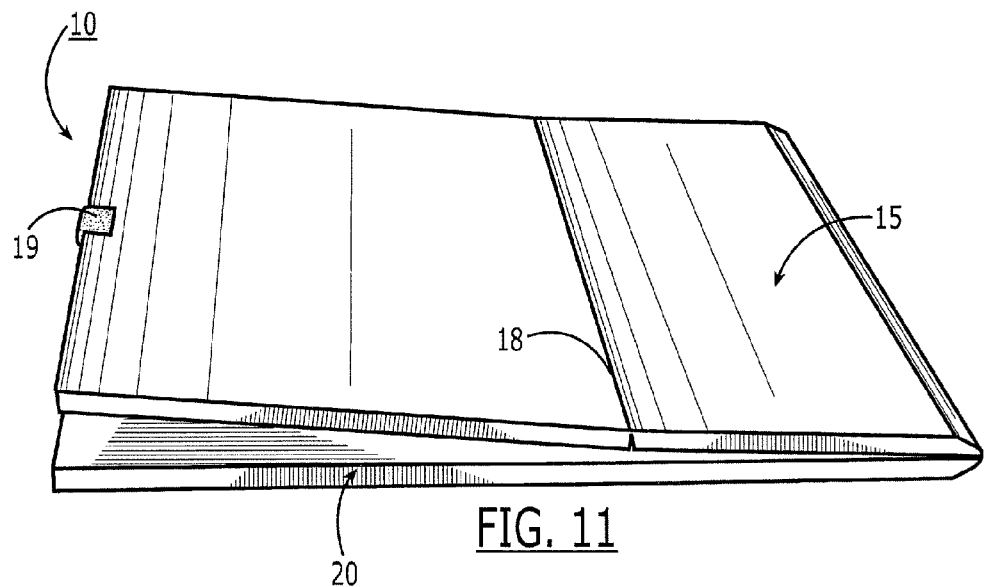
FIGS. 11-13 are a series of side perspective views of the screen case shown in FIG. 10 with the first panel being folded to a viewing configuration according to embodiments of the present invention.
Figure 12:
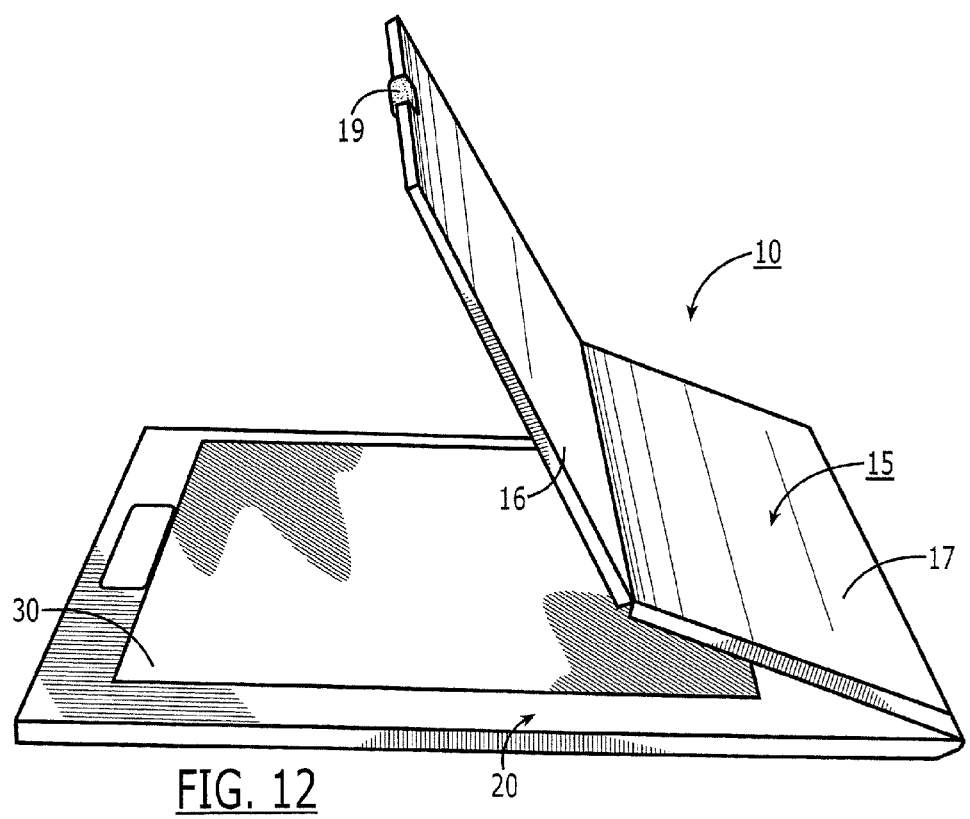
Figure 13:
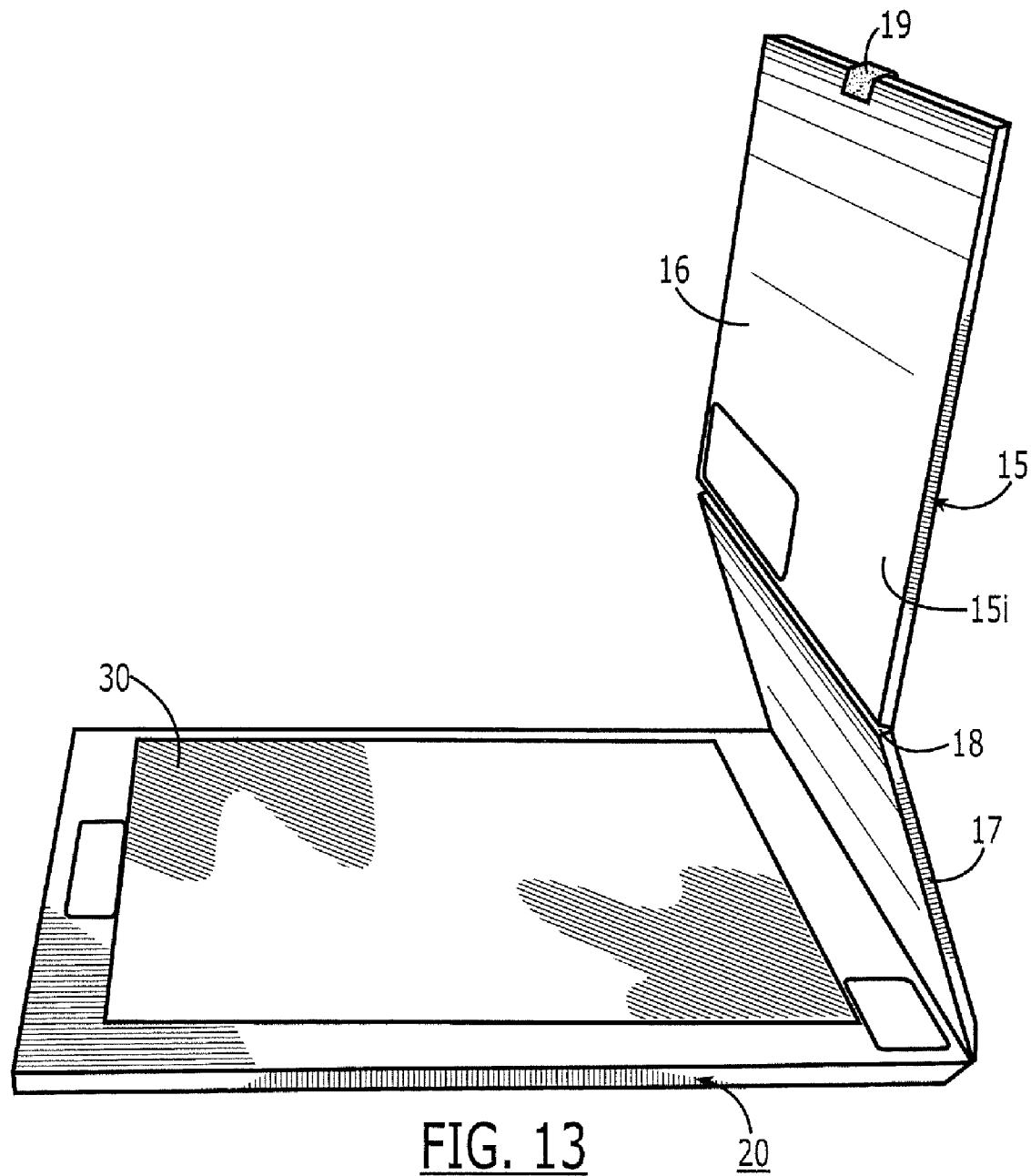

FIG. 6 illustrates an exemplary rear or outer surface 20o of the second panel 20. As shown, the panel 20 can include an attachment member 25. In this embodiment, the attachment member can be positioned closer to a top edge than a bottom edge (described with respect to the viewing configuration). A cooperating attachment member 19 can be attached to the upper portion 16 of panel 15 as shown in FIG. 7. As shown, the attachment member 19 can reside over a perimeter edge of the panel portion 16 to reside both on inner and outer surfaces of the panel 15i, 15o. The attachment members 19, 25 can repeatedly easily releasably attach using any suitable attachment structure, for example, a VELCRO® type "hook and loop" structure. In particular embodiments, a GREPTILE® gripping material from 3M can be used, which can have an average of about 3000 "micro" gripping fingers per square inch. Although the attachment member 25 is shown as a substantially vertically oriented rectangular shape, the attachment member 25 may be horizontally oriented as well and/or otherwise configured. In other embodiments, adhesives, sticky tape, keys and slots, matable configurations, a mechanical hook, latch or other releasable lock or structure can be used. In still other embodiments, the panel portion 16 may reside against the panel 20 without requiring any positive attachment.

FIG. 9 illustrates the screen 10 open as shown in FIG. 2 and residing on an underlying surface (such as a table). FIG. 10 illustrates the opposing sides of the panels shown in FIG. 9 with the laterally extending fold line 20f between the panels 15, 20.

Figure 14:
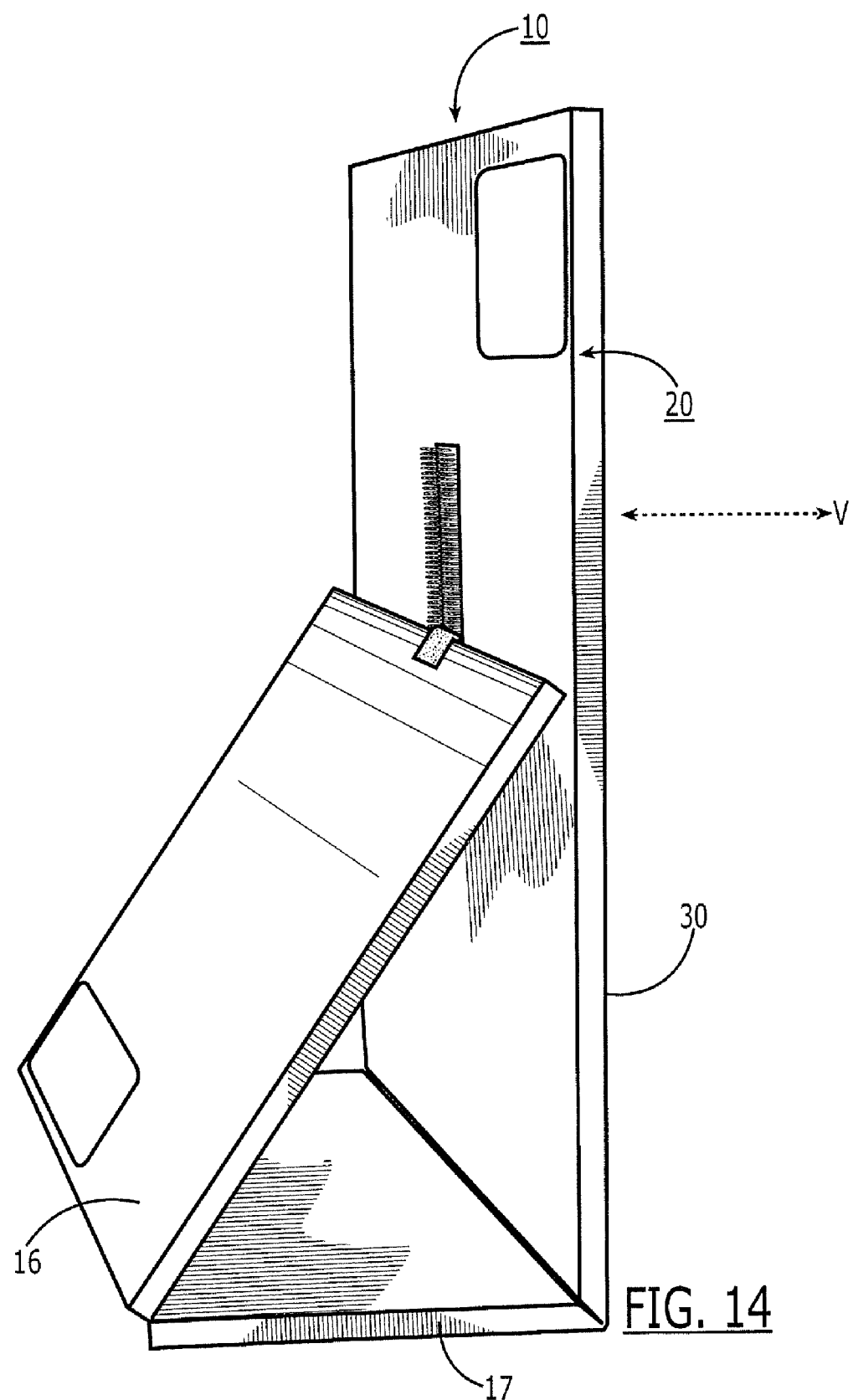
FIG. 14 is a side perspective view of the screen case shown in FIGS. 11-13 in the end viewing configuration with the first panel folded to extend rearward of the second panel and projection screen according to embodiments of the present invention.
Figure 15:
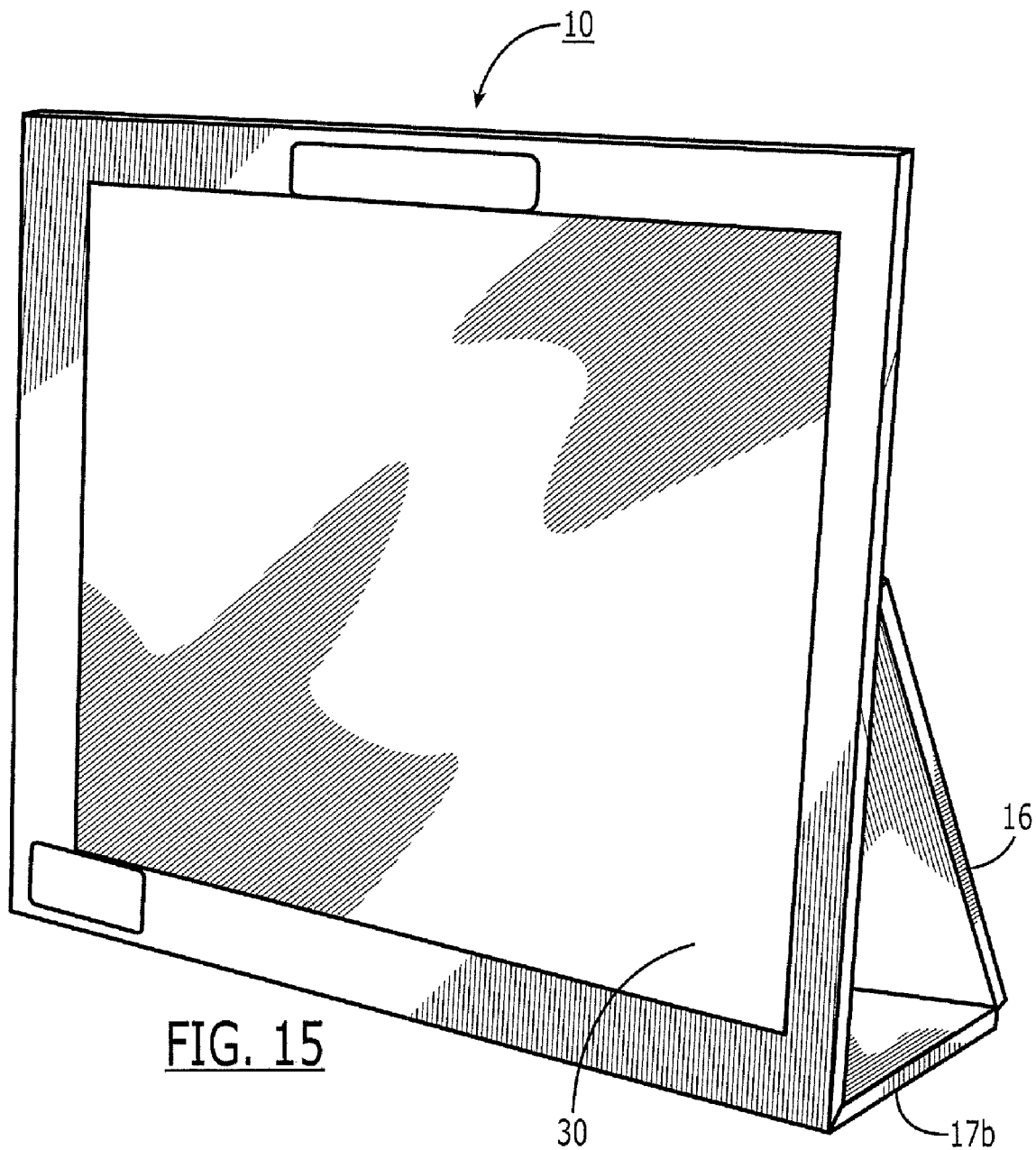
FIG. 15 is a front perspective view of the screen case in the viewing configuration shown in FIG. 14.
Figure 16:
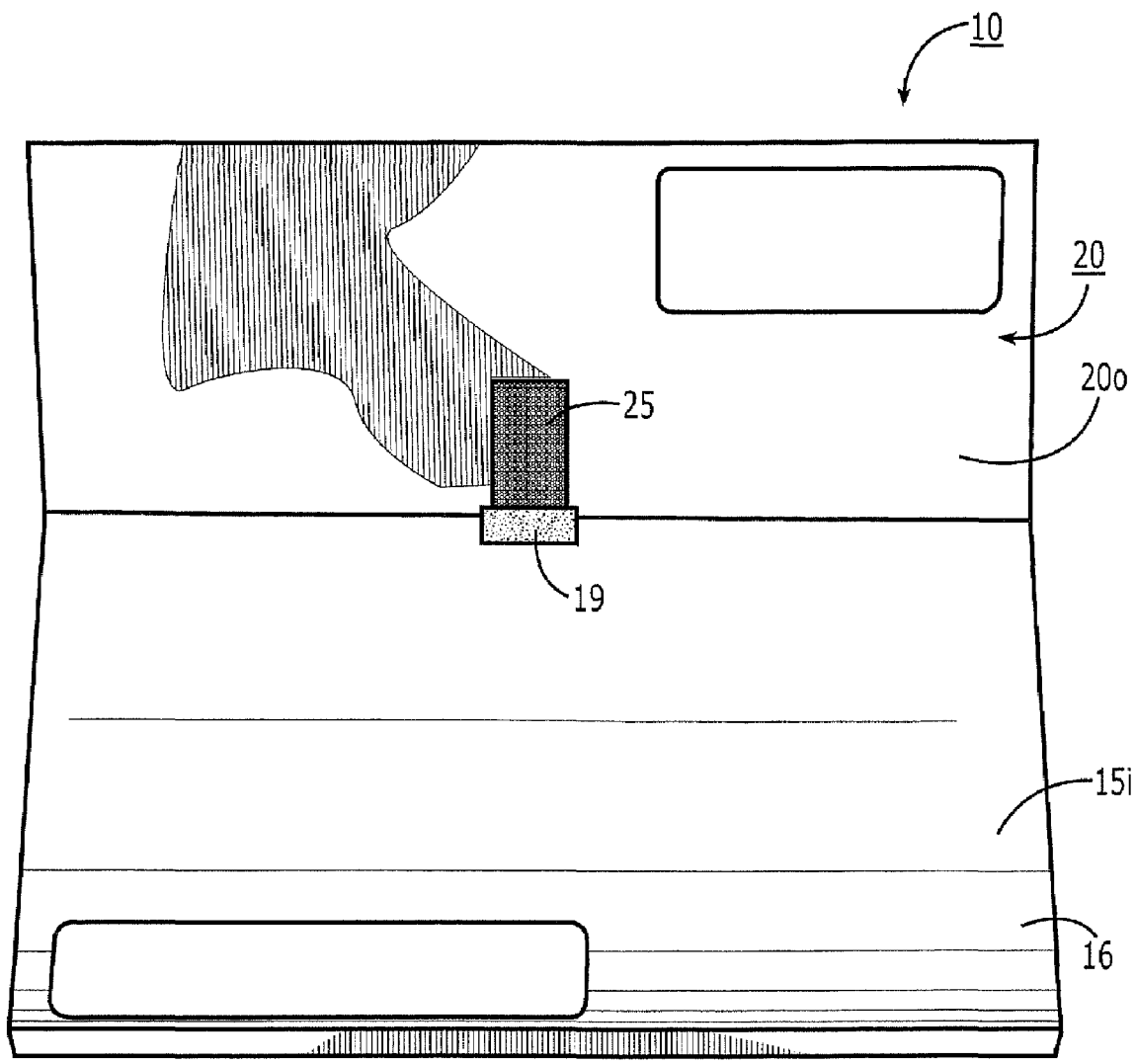
FIG. 16 is a rear view of the screen case in the viewing configuration shown in FIGS. 14 and 15.
Figure 17A:
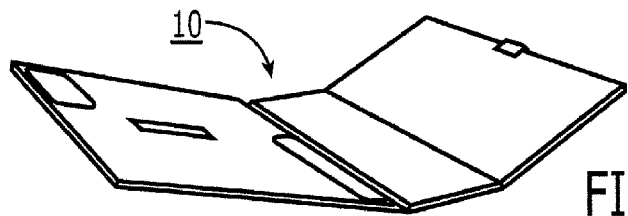
FIGS. 17A-17D are a sequence of digital images illustrating the screen case being manipulated to the viewing configuration according to embodiments of the present invention.
Figure 17B:
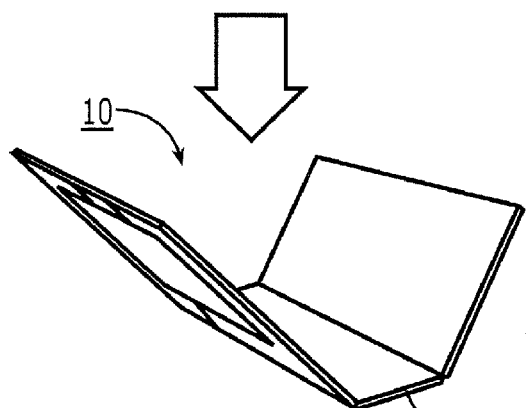
Figure 17C:
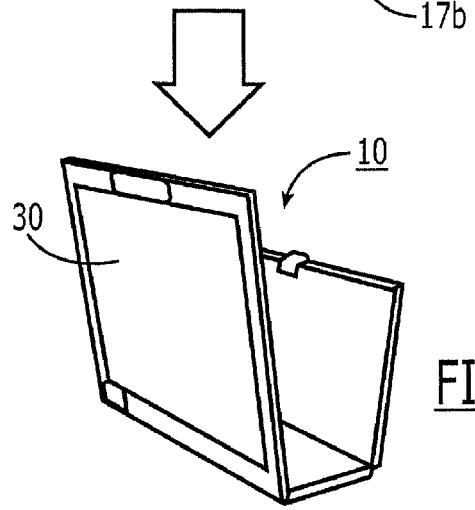
Figure 17D:
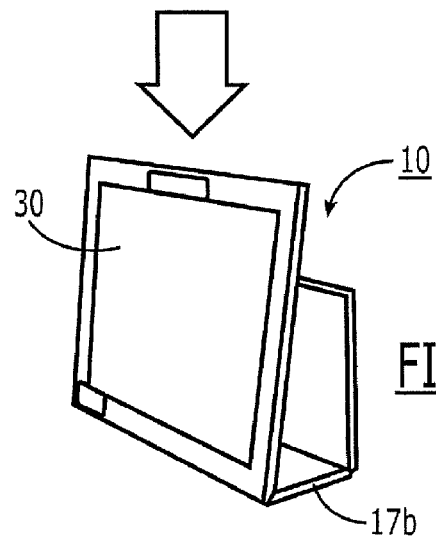

FIGS. 11-16 illustrate the screen 10 in different foldable configurations that can be used to turn the screen from a compact substantially flat carrying case with the screen therein to an upstanding three-dimensional self-supporting projection screen in a viewing configuration. FIG. 14 illustrates the viewing direction "V" (e.g., the direction the light from the projector will be transmitted).

FIGS. 17A-17D illustrate that the screen 10 can be positioned on a surface with the inner surfaces 15i, 20i facing down, the screen 10 folded so that the base 16b is horizontal and faces rearward away or behind the screen 30, with the fold lines 20f, 18f extending spaced apart on opposing sides of the base 16b, and the panel portion 17 angled upwardly to contact the panel 20. Thus, in the viewing configuration (FIG. 14), the lower portion of the first panel extends upwardly, typically at between a 30-60 degree angle from the base 16b, and contacts the outer surface of the second panel 20 and the second panel 20 resides in front of and is substantially orthogonal to the base 16b.

FIGS. 18A-18D illustrate another embodiment of a screen 10'. In this embodiment, the panels are separate panels and may be releasably attachable to one another. As shown in FIG. 18A, side straps can help maintain the two panels in alignment during transport or periods of non-use or storage. As shown in FIGS. 18B and 18C, the panels can be detached and oriented for viewing and support. The panel 15 may optionally include the two foldable segments 16, 17 as discussed above. Alternatively, as shown in FIG. 18D, the panel 15 can define the base 16b and attach to a lower portion of the screen or the screen may have one or more legs 22 that can be used to brace the panel 20 in the viewing configuration. The leg(s) 22 can be held against the panel 20 during non-use or even in depressions or channels sized and configured to hold the leg(s) substantially flush against the panel 20. The legs can be extended to brace the screen for a stable viewing configuration by a user during set-up. In other embodiments, the base 16b/panel 15 may be structurally sound enough to hold the screen upright without further reinforcement. For example, as shown in FIG. 18D, the panel 15 can include a laterally extending channel 15 sized and configured to snugly receive the lower edge portion of the panel 20. The GREPTILE® gripping material may optionally be used to releasably hold a lower portion of the panel 20 to the base 15 as appropriate.

FIG. 19A illustrates that, in some embodiments, a low-lumen projection system 200 can be provided. The system 200 can include the portable screen assembly 10 and a low-lumen projector 300. The low-lumen projector 300 can be a light-weight, battery powered DLP/LED projector 300. FIG. 19B illustrates a projector in an operational configuration in communication with the screen 30.

As described above, embodiments of the invention are directed to projector screens 30 that are suitable for use in mixed ambient light conditions. In most homes, conference rooms, classrooms or offices, the rooms are lit with combinations of general lighting (overhead fixtures, sconces), task lighting (lamps, under-cabinet illumination) and accent lighting. Task and accent lighting dominates over general lighting. Projectors tend to be used in rooms that have more task and accent lighting—living rooms, dens, and family rooms. For the most part painted ceilings are painted shades of white that produces a slight bias to ambient illumination impinging from above. In office buildings and schools general lighting tends to prevail in the form of ceiling—mounted fluorescent units. Typically, in homes and business, light signals range from about 50 lux (a darkish living room corner) to about 550 lux—a bright window-lit office and all points in between.

The maximum illuminance of a projection screen 30 is dependent on the luminance of the projector, the size of the projected image and the gain of the screen. Table 1 below shows examples of illumination that will be reflected when various size projection screens are illuminated with the luminous output of projectors of varying brightness. Signals that are between 200 and 1000 NITs (shown emphasized in Tables 1 and 2) are those that can be seen in a lit indoor room. Table 1 illustrates that low luminance projectors with low-gain screens are problematic for use in brightly lit rooms.

TABLE 1

Projection Screen Illuminance (Gain 1)

| Diagonal (4:3)" | Projector Output (Øv) | | | | | |
|---|---|---|---|---|---|---|
| | 25 | 50 | 100 | 500 | 1000 | 1500 |
| 20 | 64.24 | 128.48 | 256.97 | 1284.85 | 2569.69 | 3854.54 |
| 30 | 28.55 | 57.10 | 114.21 | 571.04 | 1142.09 | 1713.13 |
| 40 | 16.06 | 32.12 | 64.24 | 321.21 | 642.42 | 963.64 |
| 50 | 10.28 | 20.56 | 41.12 | 205.58 | 411.15 | 616.73 |
| 60 | 7.14 | 14.28 | 28.55 | 142.76 | 285.52 | 428.28 |
| 70 | 5.24 | 10.49 | 20.98 | 104.89 | 209.77 | 314.66 |
| 80 | 4.02 | 8.03 | 16.06 | 80.30 | 160.61 | 240.91 |
| 90 | 3.17 | 6.34 | 12.69 | 63.45 | 126.90 | 190.35 |
| 100 | 2.57 | 5.14 | 10.28 | 51.39 | 102.79 | 154.18 |

For projection screens, gain can be particularly important in uncontrolled light viewing environments because sufficient gain can allow almost any projector to achieve on-axis luminance that exceeds the on-axis output of most other display systems. The highlighted regions of Tables 1 and 2 show the luminance-gain combinations projector and screen that deliver image illumination equivalent or superior to the image illumination of other popular display technologies (LCD, Plasma, rear-projection TV, CRT).

TABLE 2

Gain-Adjusted Luminance of projection Screens (Gains 3, 5 and 7)

| Diagonal (4:3)" | 25 | 50 | 100 | 500 | 1000 | 1500 |
|---|---|---|---|---|---|---|
| | | | Gain = 3 | | | |
| | | | Projector Output (Øv) | | | |
| 20 | 192.73 | 385.45 | 770.91 | 3854.54 | 7709.08 | 11563.62 |
| 30 | 85.66 | 171.31 | 342.63 | 1713.13 | 3426.26 | 5139.39 |
| 40 | 48.18 | 96.36 | 192.73 | 963.64 | 1927.27 | 2890.91 |
| 50 | 30.84 | 61.67 | 123.35 | 616.73 | 1233.45 | 1850.18 |
| 60 | 21.41 | 42.83 | 85.66 | 428.28 | 856.56 | 1284.85 |
| 70 | 15.73 | 31.47 | 62.93 | 314.66 | 629.31 | 943.97 |
| 80 | 12.05 | 24.09 | 48.18 | 240.91 | 481.82 | 722.73 |
| 90 | 9.52 | 19.03 | 38.07 | 190.35 | 380.70 | 571.04 |
| 100 | 7.71 | 15.42 | 30.84 | 154.18 | 308.36 | 462.54 |
| | | | Gain = 5 | | | |
| 20 | 321.21 | 642.42 | 1284.85 | 6424.24 | 12848.47 | 19272.71 |
| 30 | 142.76 | 285.52 | 571.04 | 2855.22 | 5710.43 | 8565.65 |
| 40 | 80.30 | 160.61 | 321.21 | 1606.06 | 3212.12 | 4818.18 |
| 50 | 51.39 | 102.79 | 205.58 | 1027.88 | 2055.76 | 3083.63 |
| 60 | 35.69 | 71.38 | 142.76 | 713.80 | 1427.61 | 2141.41 |
| 70 | 26.22 | 52.44 | 104.89 | 524.43 | 1048.85 | 1573.28 |
| 80 | 20.08 | 40.15 | 80.30 | 401.51 | 803.03 | 1204.54 |
| 90 | 15.86 | 31.72 | 63.45 | 317.25 | 634.49 | 951.74 |
| 100 | 12.85 | 25.70 | 51.39 | 256.97 | 513.94 | 770.91 |
| | | | Gain = 7 | | | |
| | | | Projector Output (LØv) | | | |
| 20 | 449.70 | 899.39 | 1798.79 | 8993.93 | 17987.86 | 26981.79 |
| 30 | 199.87 | 399.73 | 799.46 | 3997.30 | 7994.60 | 11991.91 |
| 40 | 112.42 | 224.85 | 449.70 | 2248.48 | 4496.97 | 6745.45 |
| 50 | 71.95 | 143.90 | 287.81 | 1439.03 | 2878.06 | 4317.09 |
| 60 | 49.97 | 99.93 | 199.87 | 999.33 | 1998.65 | 2997.98 |
| 70 | 36.71 | 73.42 | 146.84 | 734.20 | 1468.40 | 2202.60 |
| 80 | 28.11 | 56.21 | 112.42 | 562.12 | 1124.24 | 1686.36 |
| 90 | 22.21 | 44.41 | 88.83 | 444.14 | 888.29 | 1332.43 |
| 100 | 17.99 | 35.98 | 71.95 | 359.76 | 719.51 | 1079.27 |

In the same way that a laptop computer screen has a narrower vertical region to accommodate a dimmer, lower-power backlight, high-gain projection screens can harvest light from the edges of the viewing field and concentrate it in the center of the viewing field. The trade-off is that the image becomes dimmer as the viewer moves off axis.

In some embodiments, the projector screens 30 can comprise a film or a flexible thin substrate, alone, laminated or otherwise attached and/or combined with a second material. The projection screen surface 30 can include arrays of miniaturized lenses that provide high-gain in low light or ambient light conditions. The lenses can be microlenses that create light distribution using aspheric, astigmatic, cylindrical and/or other precision-shaped patterns of lenses.

In some embodiments of the present invention, the refractive layer comprises an array of anamorphic lenses. The spatial frequency of the reflective layer can be higher than the spatial frequency of the refractive layer. In other embodiments, however, this relationship may be reversed, as long as the first and second spatial frequencies are different from one another. For additional exemplary screen materials and configurations, see, co-pending co-assigned U.S. patent application Ser. No. 11/179,162, the contents of which are hereby incorporated by reference as if recited in full herein.

Although specific embodiments of the present invention have been disclosed for illustrative purposes, those skilled in the art will appreciate that various modifications, additions and substitutions are possible, without departing from the scope and spirit of the invention as disclosed in the accompanying claims.

That which is claimed:

1. A portable front projection screen, comprising:
a first panel having opposing primary outer and inner surfaces, the first panel having at least first and second portions that are foldable relative to each other so as to be oriented at an angle relative to each other in an open configuration and closed to a coplanar flat configuration; and
a second panel foldably attached to the first panel and having opposing outer and inner primary surfaces, wherein the second panel inner surface comprises a high gain, high Ambient Rejection Ratio projection screen that extends over a major portion of the inner surface,
wherein, in a closed configuration, the first and second panels reside adjacent and substantially parallel to each other with the second panel inner surface facing and residing adjacent the first panel inner surface, and wherein the first and second panels cooperate to open to a user viewing configuration wherein the second panel is substantially vertical with the projection screen oriented to face forward toward a user, and the second portion of the first panel defines a substantially horizontal base with the first portion of the first panel angled upwardly and inwardly from the horizontal base toward the substantially vertical second panel.

2. A portable screen according to claim 1, wherein, in the viewing configuration, the first portion of the first panel is configured to releasably attach to the outer surface of the second panel.

3. A portable screen according to claim 1, wherein the first and second panels have the same size, wherein one of the first panel first and second portions forms a larger part of the first panel than the other, and wherein the first panel first and second portions are foldably attached together as closely spaced partitions separated by a laterally extending fold line.

4. A portable screen according to claim 3, wherein the first portion of the first panel has a length that is greater than a length of the second portion of the first panel, and wherein the first and second panels have substantially the same length.

5. A portable screen according to claim 4, wherein the length of the second portion of the first panel is between 25%-40% of the length of the first portion of the first panel.

6. A portable screen according to claim 1, wherein, in the viewing configuration, the first portion of the first panel extends upwardly at between a 30-60 degree angle from the base and contacts the outer surface of the second panel and the second panel resides in front of the base.

7. A portable screen according to claim 1, wherein the second panel comprises an optical film attached to the inner surface of the second panel that defines the projection screen.

8. A portable screen according to claim 1, wherein the first and second panels are substantially rectangular and have a substantially common width dimension of between 10-20 inches and a substantially common height dimension of between 8-20 inches.

9. A portable screen according to claim 1, wherein the first and second panels comprise cellulose material, and wherein the portable screen weighs between 4-8 ounces.

10. A portable screen according to claim 1, wherein the inner surface of the first panel contacts the inner surface of the second panel in the closed configuration, and wherein the first panel has a substantially smooth inner surface to thereby inhibit scratching or marking the projection screen when the panels are in the closed configuration.

11. A portable screen according to claim 1, wherein the first and second panels are sufficiently rigid to maintain a shape and configuration in the viewing configuration and have a substantially planar configuration with one end of each of the first and second panels having a different shape than an opposing end thereof so that adjacent edge portions of one end of the first and second panels taper toward an outer edge along a fold line, and wherein the panels have a thickness that is less than 0.25 inches thick and are fixedly attached together along the fold line.

12. A portable screen assembly according to claim 1, wherein the projection screen is a high Ambient Rejection Ratio (ARR), high-contrast, and high-gain screen.

13. A portable projection screen according to claim 1, wherein the portable projection screen is a two-panel device with only the first and second panels, and wherein only the second panel includes a projection screen.

14. A portable front projection screen, comprising:
a first panel having opposing primary outer and inner surfaces, the first panel having first and second portions that are foldable relative to each other so as to be oriented at an angle relative to each other in an open viewing configuration and closed to a substantially coplanar flat configuration in a closed storage configuration; and
a second panel having opposing upper and lower edge portions, the lower edge portion being integrally or releasably attached to the first portion of the first panel, the second panel having opposing outer and inner primary surfaces, wherein the second panel inner surface comprises a high gain front projection screen,
wherein, in the closed storage configuration, the first and second panels reside adjacent and substantially parallel to each other with the inner surfaces thereof facing each other and the outer surfaces thereof defining an outer surface of the device, and wherein the first and second panels cooperate to provide the viewing configuration wherein the second panel is substantially vertical with the projection screen oriented to face forward toward a user, and the second portion of the first panel defines a substantially horizontal base with the first portion of the first panel angled upwardly and inwardly from the horizontal base toward the substantially vertical second panel.

15. A portable screen according to claim 14, wherein the second panel comprises a hook and/or loop attachment member on an outer surface thereof, and wherein the first portion of the first panel comprises a cooperating hook and/or loop attachment member that, in the viewing configuration, extends from an outer surface to an inner surface over an upper perimeter edge of the first portion.

16. A portable screen according to claim 14, wherein the portable projection screen is a two-panel device with only the first and second panels, and wherein only the second panel includes a projection screen.

17. A method of setting up a portable projection screen for user viewing, comprising:
providing a portable screen comprising first and second panels with respective inner and outer primary surfaces with the first and second panels residing adjacent and substantially parallel to each other one above the other or substantially parallel and side-by-side in a folded closed configuration, wherein the second panel inner surface has an integral front projection screen, and wherein the first panel is partitioned with first and second partitions foldable relative to each other; and
orienting the first and second panels to a viewing configuration with the projection screen facing forward and the second panel being substantially vertical while the second partition of the first panel extends rearward away from the projection screen to define a substantially horizontal support base and the first partition angles upwardly to contact the second panel in the viewing configuration, and wherein, in the viewing configuration, the first and second panels define a triangular shape when viewed from the side.

18. A method according to claim 17, wherein the first panel first and second foldable partitions are configured with the second partition being foldably attached to the second panel along a first laterally extending fold line, wherein the first partition defines one end of the first panel and the second partition defines an opposing end of the first panel with the first and second partitions being foldably attached together along a second laterally extending fold line that is parallel to the first fold line, and wherein the first partition releasably attaches to the second panel in the viewing configuration.

19. A low lumen portable projector system, comprising:
a portable low-lumen projector; and
a front projection screen adapted to receive light and images from the portable low-lumen projector, the projection screen comprising:
a first panel having opposing primary outer and inner surfaces, the first panel having first and second portions that are foldable relative to each other so as to be oriented at an angle relative to each other in an open configuration and closed to a substantially coplanar flat configuration; and
a second panel foldably attached to the first panel and having opposing outer and inner primary surfaces, wherein the second panel inner surface comprises a front projection screen,
wherein, in a closed configuration, the first and second panels reside adjacent and substantially parallel to each other with the inner surfaces thereof facing each other, and wherein the first and second panels cooperate to open to a user viewing configuration wherein the second panel is substantially vertical with the projection screen and oriented to face forward toward a user, and the second portion of the first panel defines a substantially horizontal base with the first portion of the first panel angled upwardly and inwardly from the horizontal base toward the substantially vertical second panel.

20. A system according to claim 19, wherein the low lumen projector is a microprojector.

21. A system according to claim 19, wherein the projection screen is a high Ambient Rejection Ratio (ARR), high-contrast, and high-gain screen, and wherein the projection screen has only two panels, the first and second panels.

22. A two-panel portable projection screen comprising:
a first panel having upper and lower ends, the first panel having first and second foldable partitions that are fixedly attached together, wherein the first and second partitions are oriented at different angles in a viewing configuration and are in coplanar alignment in a closed configuration, and wherein the first panel is devoid of a projection screen; and
a second panel fixedly and foldably attached to one end of the first panel along a laterally extending fold line adjacent the second partition, wherein the second panel has a high gain, high Ambient Rejection Ratio front projection screen that extends over a major portion of an inner surface thereof,
wherein, in the closed configuration with the fold line oriented downward, the first partition has an upper edge that defines the first panel upper end and the second partition has a lower edge that defines the first panel lower end,
wherein, in the closed configuration with the fold line oriented downward, the first and second panels reside one above the other with the screen facing an inner surface of the first panel, and wherein the first and second panels cooperate to open to the viewing configuration whereby the second panel projection screen is oriented to face forward toward a user and the second partition of the first panel defines a horizontal base with the first partition of the first panel angled upwardly and inwardly from the horizontal base toward the substantially vertical second panel to contact a rear surface of the second panel so that the first and second panels define a triangle shape when viewed from the side.

23. A portable projection screen device according to claim 22, wherein the first partition has a hook and/or loop attachment member that extends over a perimeter edge thereof and the second panel has a cooperating hook and/or loop attachment member on an outer surface thereof.

24. A portable projection screen device according to claim 23, wherein the second panel cooperating hook and/or loop attachment member resides laterally centered and spaced apart from upper and lower edges.

25. A portable projection screen device according to claim 22, wherein the first partition is longer than the second partition.

26. A portable projection screen device according to claim 22, wherein the second partition comprises corrugated cardboard.

* * * * *

UNITED STATES PATENT AND TRADEMARK OFFICE
CERTIFICATE OF CORRECTION

PATENT NO. : 7,595,930 B2
APPLICATION NO. : 11/961377
DATED : September 29, 2009
INVENTOR(S) : Adams et al.

It is certified that error appears in the above-identified patent and that said Letters Patent is hereby corrected as shown below:

In the Detailed Description:
Column 9 - 10, Tables 1 - 2: Please correct Tables by adding subtitle in Table 2 after
(Gain=5) to read: "Projector Output (Øv)"

Column 9 -10, Tables 1 - 2: Please correct Tables to reflect highlighted regions as shown below:

Table 1: Projection Screen Illuminance (Gain 1)

| Diagonal (4:3)" | Projector Output (Øv) | | | | | |
|---|---|---|---|---|---|---|
| | 25 | 50 | 100 | 500 | 1000 | 1500 |
| 20 | 64.24 | 128.48 | 256.97 | 1284.85 | 2569.69 | 3854.54 |
| 30 | 28.55 | 57.10 | 114.21 | 571.04 | 1142.09 | 1713.13 |
| 40 | 16.06 | 32.12 | 64.24 | 321.21 | 642.42 | 963.64 |
| 50 | 10.28 | 20.56 | 41.12 | 205.58 | 411.15 | 616.73 |
| 60 | 7.14 | 14.28 | 28.55 | 142.76 | 285.52 | 428.28 |
| 70 | 5.24 | 10.49 | 20.98 | 104.89 | 209.77 | 314.66 |
| 80 | 4.02 | 8.03 | 16.06 | 80.30 | 160.61 | 240.91 |
| 90 | 3.17 | 6.34 | 12.69 | 63.45 | 126.90 | 190.35 |
| 100 | 2.57 | 5.14 | 10.28 | 51.39 | 102.79 | 154.18 |

Table 2: Gain-Adjusted Luminance of projection Screens (Gains 3, 5 and 7)

Gain = 3

| Diagonal (4:3)" | Projector Output (Øv) | | | | | |
|---|---|---|---|---|---|---|
| | 25 | 50 | 100 | 500 | 1000 | 1500 |
| 20 | 192.73 | 385.45 | 770.91 | 3854.54 | 7709.08 | 11563.62 |
| 30 | 85.66 | 171.31 | 342.63 | 1713.13 | 3426.26 | 5139.39 |
| 40 | 48.18 | 96.36 | 192.73 | 963.64 | 1927.27 | 2890.91 |
| 50 | 30.84 | 61.67 | 123.35 | 616.73 | 1233.45 | 1850.18 |
| 60 | 21.41 | 42.83 | 85.66 | 428.28 | 856.56 | 1284.85 |
| 70 | 15.73 | 31.47 | 62.93 | 314.66 | 629.31 | 943.97 |
| 80 | 12.05 | 24.09 | 48.18 | 240.91 | 481.82 | 722.73 |
| 90 | 9.52 | 19.03 | 38.07 | 190.35 | 380.70 | 571.04 |
| 100 | 7.71 | 15.42 | 30.84 | 154.18 | 308.36 | 462.54 |

| Gain = 5 | | | | | | |
|---|---|---|---|---|---|---|
| Diagonal | Projector Output (Øv) | | | | | |
| (4:3)" | 25 | 50 | 100 | 500 | 1000 | 1500 |
| 20 | 321.21 | 642.42 | 1284.85 | 6424.24 | 12848.47 | 19272.71 |
| 30 | 142.76 | 285.52 | 571.04 | 2855.22 | 5710.43 | 8565.65 |
| 40 | 80.30 | 160.61 | 321.21 | 1606.06 | 3212.12 | 4818.18 |
| 50 | 51.39 | 102.79 | 205.58 | 1027.88 | 2055.76 | 3083.63 |
| 60 | 35.69 | 71.38 | 142.76 | 713.80 | 1427.61 | 2141.41 |
| 70 | 26.22 | 52.44 | 104.89 | 524.43 | 1048.85 | 1573.28 |
| 80 | 20.08 | 40.15 | 80.30 | 401.51 | 803.03 | 1204.54 |
| 90 | 15.86 | 31.72 | 63.45 | 317.25 | 634.49 | 951.74 |
| 100 | 12.85 | 25.70 | 51.39 | 256.97 | 513.94 | 770.91 |
| Gain = 7 | | | | | | |
|---|---|---|---|---|---|---|
| Diagonal | Projector Output (LØv) | | | | | |
| (4:3)" | 25 | 50 | 100 | 500 | 1000 | 1500 |
| 20 | 449.70 | 899.39 | 1798.79 | 8993.93 | 17987.86 | 26981.79 |
| 30 | 199.87 | 399.73 | 799.46 | 3997.30 | 7994.60 | 11991.91 |
| 40 | 112.42 | 224.85 | 449.70 | 2248.48 | 4496.97 | 6745.45 |
| 50 | 71.95 | 143.90 | 287.81 | 1439.03 | 2878.06 | 4317.09 |
| 60 | 49.97 | 99.93 | 199.87 | 999.33 | 1998.65 | 2997.98 |
| 70 | 36.71 | 73.42 | 146.84 | 734.20 | 1468.40 | 2202.60 |
| 80 | 28.11 | 56.21 | 112.42 | 562.12 | 1124.24 | 1686.36 |
| 90 | 22.21 | 44.41 | 88.83 | 444.14 | 888.29 | 1332.43 |
| 100 | 17.99 | 35.98 | 71.95 | 359.76 | 719.51 | 1079.27 |
In the Claims:
Column 12, Claim 14, Line 42: Please correct "fiat" to read -- flat --
Signed and Sealed this
Twelfth Day of January, 2010
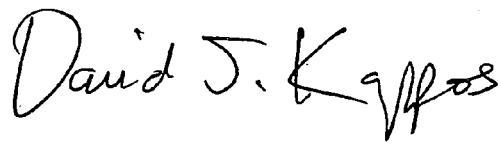
David J. Kappos
*Director of the United States Patent and Trademark Office*